(12) United States Patent
Tanimura et al.

(10) Patent No.: US 8,115,793 B2
(45) Date of Patent: Feb. 14, 2012

(54) OPTICAL SCANNING DEVICE AND IMAGE FORMING APPARATUS USING THE SAME

(75) Inventors: Ken Tanimura, Utsunomiya (JP); Manabu Kato, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 501 days.

(21) Appl. No.: 12/354,581

(22) Filed: Jan. 15, 2009

(65) Prior Publication Data

US 2009/0185826 A1 Jul. 23, 2009

(30) Foreign Application Priority Data

Jan. 18, 2008 (JP) ................................ 2008-009080

(51) Int. Cl.
- B41J 27/00 (2006.01)
- B41J 2/385 (2006.01)
- B41J 2/47 (2006.01)
- H01J 29/70 (2006.01)

(52) U.S. Cl. ........ 347/241; 347/129; 347/231; 347/237; 347/256; 347/261

(58) Field of Classification Search .................. 347/129, 347/132, 231, 237, 241, 243, 256, 259–261
See application file for complete search history.

(56) References Cited

U.S. PATENT DOCUMENTS

| | | | | |
|---|---|---|---|---|
| 5,966,570 A * | 10/1999 | Till et al. | ......................... | 399/133 |
| 6,185,029 B1 * | 2/2001 | Ishihara | ..................... | 359/216.1 |
| 6,825,870 B2 | 11/2004 | Kato | ............... | 347/258 |
| 7,034,859 B2 | 4/2006 | Ishihara et al. | ................ | 347/244 |
| 7,050,209 B2 | 5/2006 | Kato | .............................. | 359/204 |
| 7,053,922 B2 | 5/2006 | Kato et al. | ..................... | 347/244 |
| 7,064,877 B2 | 6/2006 | Kato | ............................. | 359/204 |

(Continued)

FOREIGN PATENT DOCUMENTS

| | | |
|---|---|---|
| JP | 2727572 | 2/1990 |
| JP | 2003-140075 | 5/2003 |
| JP | 2005-266775 | 9/2005 |

OTHER PUBLICATIONS

Machine-generated English language translation of previously-cited Japan 2003-140075.

Primary Examiner — Charlie Peng
Assistant Examiner — Hung Lam
(74) Attorney, Agent, or Firm — Fitzpatrick, Cella, Harper & Scinto

(57) ABSTRACT

An optical scanning device includes at least one scanning unit having a deflector for scanningly deflecting a light beam from a light source, and an imaging optical system for imaging the light beam scanningly deflected by the deflector upon a plurality of photosensitive drums, wherein, at each of a plurality of light paths extending from the deflector to the plurality of photosensitive drums, at least one reflection member for turning the light path into a sub-scan direction is provided, wherein the plurality of light paths are different in the number of the reflection members, wherein a polarization direction of a light beam incident on each reflection of the plurality of light paths is S-polarized at an optical axis of the imaging optical system, wherein the reflection surfaces of all the reflection members of the plurality of light paths have the same film structure, and wherein the difference among the plurality of light paths of a total turn angle defined by the reflection surface or surfaces of the reflection member or members in the sub-scan direction at the optical axis of said imaging optical system, is not greater than 40 degrees.

14 Claims, 14 Drawing Sheets

U.S. PATENT DOCUMENTS

| | | | |
|---|---|---|---|
| 7,248,279 B2 | 7/2007 | Ishihara et al. | 347/244 |
| 7,251,067 B2 | 7/2007 | Kudo | 359/205 |
| 7,362,487 B2 * | 4/2008 | Kimura | 359/205.1 |
| 2005/0185236 A1 | 8/2005 | Kudo | 359/205 |
| 2006/0250673 A1 * | 11/2006 | Kudo | 359/205 |
| 2009/0091732 A1 | 4/2009 | Kato | 355/67 |
| 2009/0123179 A1 | 5/2009 | Tanimura | 399/151 |

\* cited by examiner

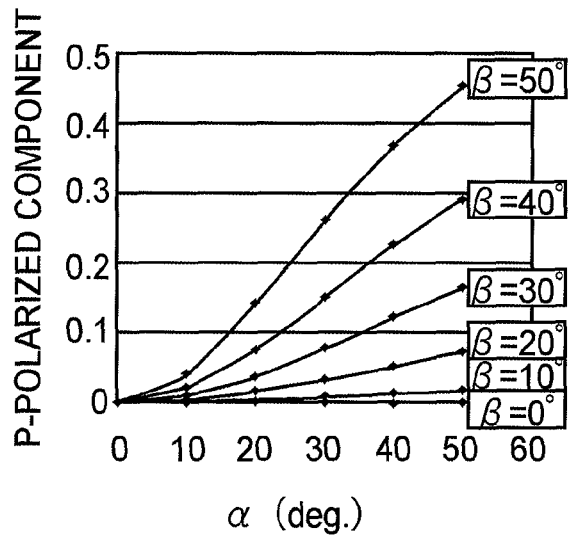
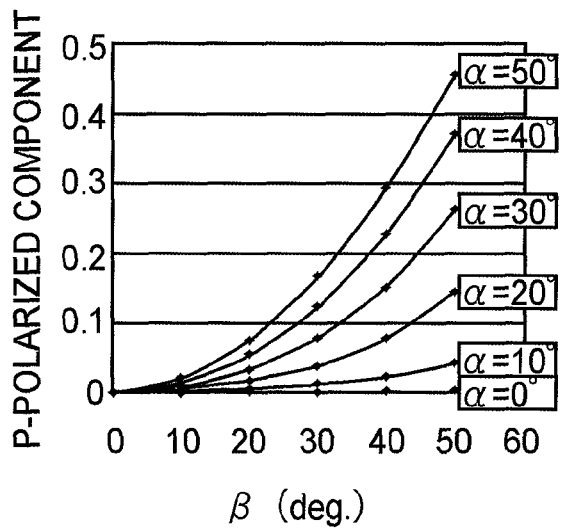
FIG.3A  FIG.3B
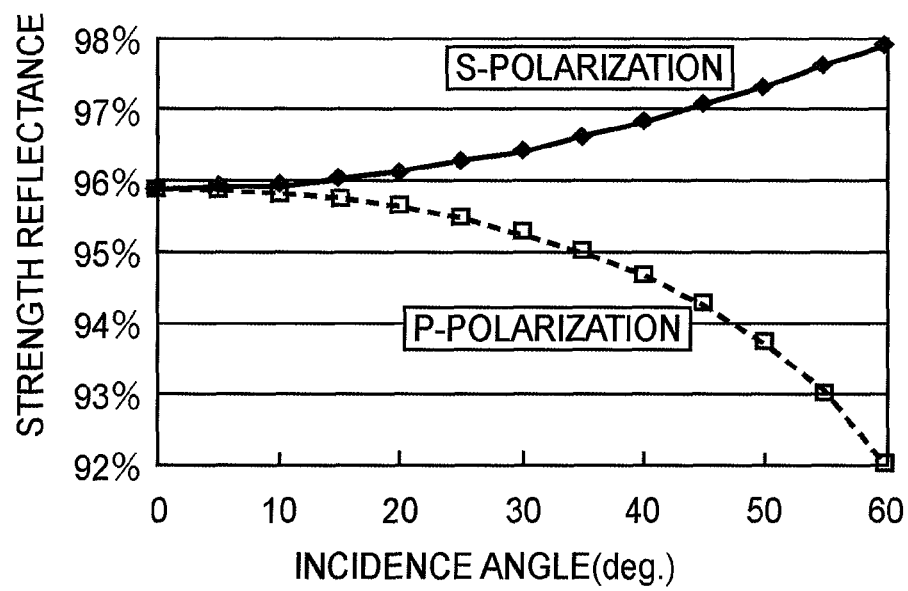
FIG.4

OPTICAL SCANNING DEVICE AND IMAGE FORMING APPARATUS USING THE SAME

FIELD OF THE INVENTION AND RELATED ART

This invention relates to an optical scanning device and an image forming apparatus using the same. The present invention is particularly suitably usable in an image forming apparatus such as a laser beam printer (LBP), a digital copying machine or a multifunction printer, for example, having an electrophotographic process.

Conventionally, in optical scanning devices such as a laser beam printer (LBP), a light beam optically modulated by light source means in accordance with an image signal and emitted from it is periodically deflected by deflecting means comprised of a rotary polygonal mirror (polygon mirror).

Then, the deflected light beam is converged into a spot shape upon a photosensitive recording medium (photosensitive drum) surface by means of an imaging optical system having an fθ characteristic, by which that surface is optically scanned and the image recording is performed.

FIG. 16 is a schematic diagram of a main portion of a conventional optical scanning device.

In the diagram, a divergent light beam emitted from light source means 91 is converted into a parallel light beam by a collimator lens 92. The light beam is restricted by a stop 93 and then it is incident on a cylindrical lens 94 having a refracting power only in the sub-scan direction (within the sub-scan section).

With regard to the main-scan direction (main-scan section), the parallel light beam incident on the cylindrical lens 94 goes out of the cylindrical lens 94 while being unchanged at all. Within the sub-scan section, on the other hand, the parallel light beam is converged and is imaged as a line image on the deflecting surface (reflection surface) 95a of deflecting means 95 which is comprised of a rotary polygonal mirror.

Subsequently, the light beam deflected by the deflecting surface 95a of the deflecting means 95 is directed to a photosensitive drum surface 98 as a surface to be scanned (scan surface) through an imaging optical system 96 having an fθ characteristic.

Then, by rotating the deflecting means 95 in the direction of an arrow A, the photosensitive drum surface 98 is optically scanned in the direction of an arrow B and the imagewise information is recorded thereon.

In the optical scanning device mentioned above, before scanning the photosensitive drum surface 98 with the light spot, the timing for starting the image formation on photosensitive drum surface 98 is adjusted and, to this end, a synchronous detecting sensor 99 as a photodetector is provided.

This synchronous detecting sensor 99 serves to receive a synchronous detecting light beam which is a portion of the light beam scanningly deflected by the deflecting means 5, more specifically, the light beam as the same is scanning the region outside the image forming region before it scans the image forming region on the photosensitive drum surface 98.

This synchronous detecting light beam is reflected by a synchronous detecting mirror 97, and it is collected by a synchronous detecting lens (not shown) and is incident on the synchronous detecting sensor 99.

Then, from an output signal of this synchronous detecting sensor 99, a synchronous detecting signal (synchronization signal) is detected and, based on this synchronous detecting signal, the start timing of the image recording on the photosensitive drum surface 98 is adjusted.

The imaging optical system 96 shown in the diagram is so constituted that in the sub-scan section the deflecting surface 95a of the deflecting means 95 and the photosensitive drum surface 98 are put into a conjugate relationship. Base on this, the surface tilt of deflecting surface 95a is compensated.

In the optical scanning device such as described above, due to the angular characteristic of the transmittance of the imaging lens, the light intensity at scan edge decreases as compared with that at a scan central portion. Thus, the angular dependence of the light intensity called "shading" occurs.

In order to correct such shading, for example, the polarization characteristic of a reflection member such as a mirror or of a transmission member may be set appropriately in dependence upon the polarization state of an incident light beam to make uniform the light quantity across the photosensitive drum surface (see Patent Document No. 1).

On the other hand, as a trend of recent optical scanning devices, printing machines having faster printing speed have been desired.

For example, in the case of color LBP, if the printing speed is the top priority, tandem type machines in which four photosensitive drums corresponding to four colors are respectively scanned and images are transferred to a transfer sheet are desirable more than the machines in which a single photosensitive drum surface is scanned four times by the light and images are transferred to a transfer sheet.

Furthermore, from the standpoint of saving the office space, compact optical scanning devices are desired. By bending light paths complicatedly with use of mirrors, the whole size of optical scanning devices can be made small (see Patent Document No. 2).

In the optical scanning device such as described above, not only to equalize the light quantity upon the photosensitive drums corresponding to different colors but also to avoid color unevenness due to the concentration difference of each color when the colors are superposed one upon another, it is necessary to perform similar shading compensation with respect to the four photosensitive drums.

However, in respective light paths, the incidence angle of the light beam to the mirror is different.

In consideration of this, in order to assure similar shading compensation with respect to the four photosensitive drums, for example, mirrors having their polarization properties optimized individually in accordance with the incidence angle may be used (see Patent Document No. 3).

PATENT DOCUMENTS

1. Registered Japanese Patent No. 2727572
2. Japanese Laid-Open Patent Application No. 2003-140075
3. Japanese Laid-Open Patent Application No. 2005-266775

SUMMARY OF THE INVENTION

Conventionally, in order to individually optimize the polarization properties of the mirrors, several types of mirrors having different film structures are manufactured: such as, for example, different types of films constituting the mirrors are used; or the mirrors are made with different film thicknesses.

By doing so, similar shading compensation is carried out with respect to the four photosensitive drums as described above.

In recent years, optical scanning devices by which the manufacture of mirrors can be facilitated and by which the shading compensation on the photosensitive drum surface can be done with a simple structure, have been desired.

The present invention provides an optical scanning device which is compact in size and enables high-speed printing, and which assures facilitated manufacture of reflection members and optimum shading compensation, as well as an image forming apparatus using the same.

In accordance with an aspect of the present invention, there is provided an optical scanning device, comprising: at least one scanning unit including deflecting means configured to scanningly deflect a light beam emitted from light source means, and an imaging optical system configured to image the light beam scanningly deflected by a deflecting surface of said deflecting means upon a plurality of photosensitive drums, wherein, at each of a plurality of light paths extending from said deflecting means to the plurality of photosensitive drums, at least one reflection member configured to turn the light path into a sub-scan direction is provided, wherein the plurality of light paths are different in the number of the reflection members, wherein a polarization direction of a light beam incident on a reflection surface of each reflection member disposed at each of the plurality of light paths is S-polarized at an optical axis of said imaging optical system, wherein the reflection surfaces of all the reflection members disposed at the plurality of light paths have the same film structure, and wherein the difference among the plurality of light paths of a total turn angle defined by the reflection surface or surfaces of the reflection member or members in the sub-scan direction at the optical axis of said imaging optical system, is not greater than 40 degrees.

In one preferred form of this aspect of the present invention, at a light path among the plurality of light paths having fewer reflection member or members than the other light paths, there is a reflection member having an incidence angle of the light beam upon the reflection member in the sub-scan direction at the optical axis of said imaging optical system, which incidence angle is not less than 40 degrees.

At a light path among the plurality of light paths having more reflection members than the other light paths, there may be a reflection member having an incidence angle of the light beam upon the reflection member in the sub-scan direction at the optical axis of said imaging optical system, which incidence angle is not greater than 30 degrees.

When the incidence angle of the light beam on the reflection member in the sub-scan direction at the optical axis of said imaging optical system is $\beta$, the incidence angle of the light beam on the reflection member in the sub-scan direction outside the optical axis of said imaging optical system is $\delta$, a reflectance as an S-polarized light is incident on the reflection member at an incidence angle $\delta$ is $Rs(\delta)$, and a reflectance as a P-polarized light is incident on the reflection member at an incidence angle $\delta$ is $Rp(\delta)$, and when $\delta \geq 50$ degrees, a condition
where $$0.94 \leq 1 + \left(\frac{Rp(\delta)}{Rs(\delta)} - 1\right)\frac{1}{1+D} \leq 0.99$$

$$\frac{1}{D} = \left(1 - \frac{\cos^2\delta}{\cos^2\beta}\right)\tan^2\beta$$

may be satisfied.

When the incidence angle of the light beam on the reflection member in the sub-scan direction at the optical axis of said imaging optical system is $\beta$, the incidence angle of the light beam on the reflection member in the sub-scan direction outside the optical axis of said imaging optical system is $\delta$, a reflectance as an S-polarized light is incident on the reflection member at an incidence angle $\delta$ is $Rs(\delta)$, and a reflectance as a P-polarized light is incident on the reflection member at an incidence angle $\delta$ is $Rp(\delta)$, and when $\delta \leq 50$ degrees, a condition $$0.97 \leq 1 + \left(\frac{Rp(\delta)}{Rs(\delta)} - 1\right)\frac{1}{1+D} \leq 1.00$$

where $$\frac{1}{D} = \left(1 - \frac{\cos^2\delta}{\cos^2\beta}\right)\tan^2\beta$$

may be satisfied.

In accordance with another aspect of the present invention, there is provided an image forming apparatus, comprising: an optical scanning device as recited above; a photosensitive member disposed at a surface to be scanned; a developing device configured to develop an electrostatic latent image formed on said photosensitive member with a light beam scanningly deflected by said optical scanning device, to produce a toner image; a transferring device configured to transfer the developed toner image onto a transfer material; and a fixing device configured to fix the transferred toner image, on the transfer material.

In accordance with a further aspect of the present invention, there is provided an image forming apparatus, comprising: an optical scanning device as recited above; and a printer controller configured to convert code data supplied from an outside machine into an imagewise signal and to input the imagewise signal into said optical scanning device.

In accordance with a yet further aspect of the present invention, there is provided a color image forming apparatus, comprising: an optical scanning devices as recited above; and a plurality of image bearing members each being disposed at a surface to be scanned by said optical scanning device, and configured to form images of different colors.

The color image forming apparatus may further comprise a printer controller configured to convert a color signal supplied from an outside machine into imagewise data of different colors and to input the imagewise data into corresponding optical scanning devices.

These and other objects, features and advantages of the present invention will become more apparent upon a consideration of the following description of the preferred embodiments of the present invention taken in conjunction with the accompanying drawings.

BRIEF DESCRIPTION OF THE DRAWINGS

FIGS. 3A and 3B are graphs showing the rate of the P-polarized component, differing with the difference of incidence angle on the mirror.

FIG. 4 is a graph showing the intensity reflectance, differing with the difference of the sub-scan incidence angle on an aluminum monolayer mirror.

DESCRIPTION OF THE PREFERRED EMBODIMENTS

Preferred embodiments of the present invention will now be described with reference to the attached drawings.

Embodiment 1

An optical scanning device according to the present invention may comprise one or more scanning units each including light source means, deflecting means for scanningly deflecting a light beam emitted from the light source means, and an imaging optical system for imaging the light beam scanningly deflected by the deflecting surface of the deflecting means upon a plurality of photosensitive drums. Furthermore, at a plurality of light paths extending from the deflecting means to the photosensitive drums, one or more reflection members for turning the light paths in the sub-scan direction may be provided. At least one light path of the plural light paths may be provided with plural reflection members.

Here, the difference among the light paths of the total of the turn angles in the sub-scan direction of each light path may be not greater than 40 degrees and, at each light path, the polarization direction of the light beam to be incident on each reflection member may be S-polarized on the optical axis of the imaging optical system. The reflection surfaces of the reflection members may be comprised of the same film structure.

Figure 1A:
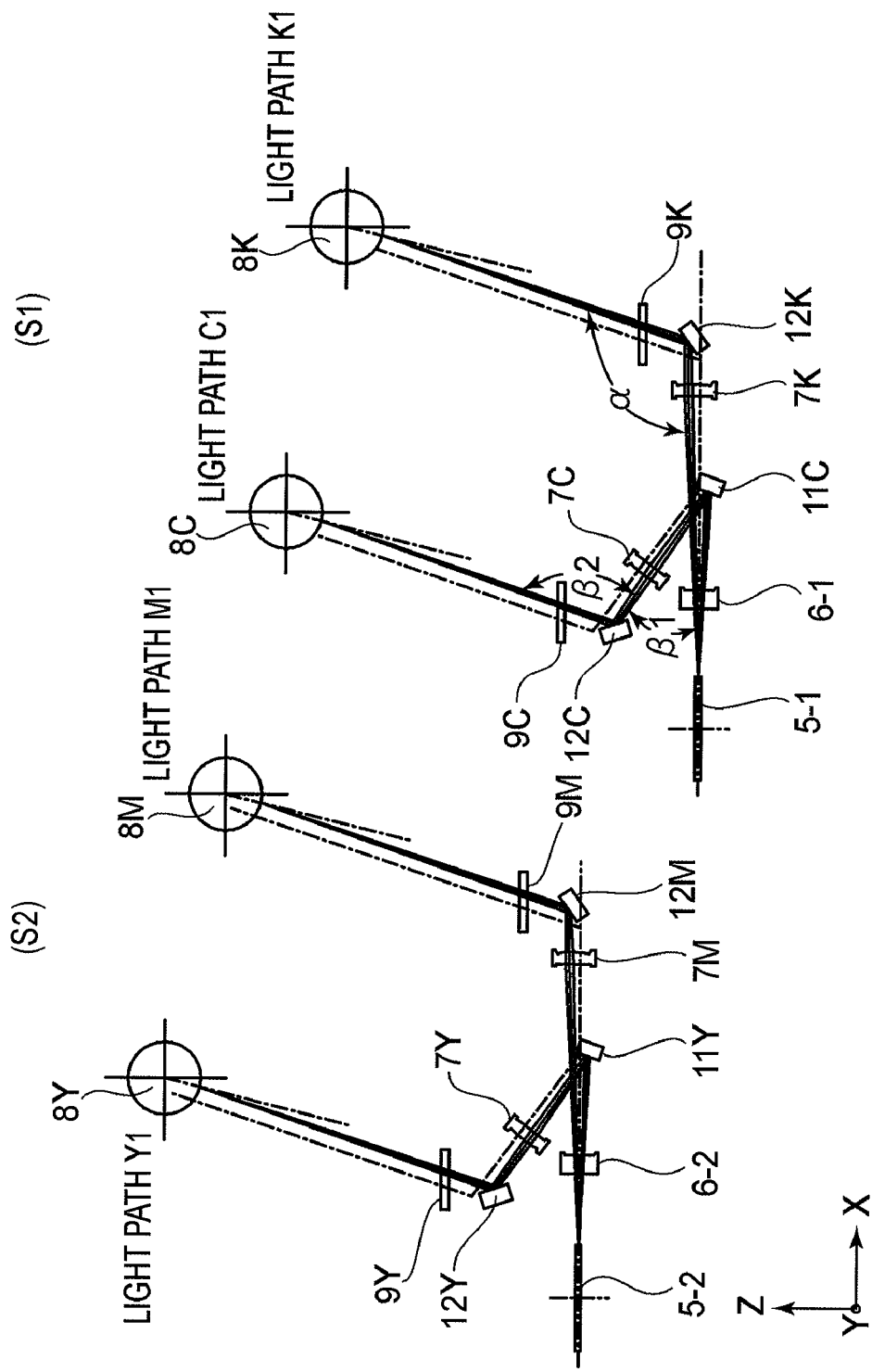
FIG. 1A is a sub-scan sectional view of a first embodiment of the present invention.

FIG. 1A is a sectional view (sub-scan sectional view) of a main portion of the first embodiment of the present invention, along a sub-scan direction.

Figure 1B:
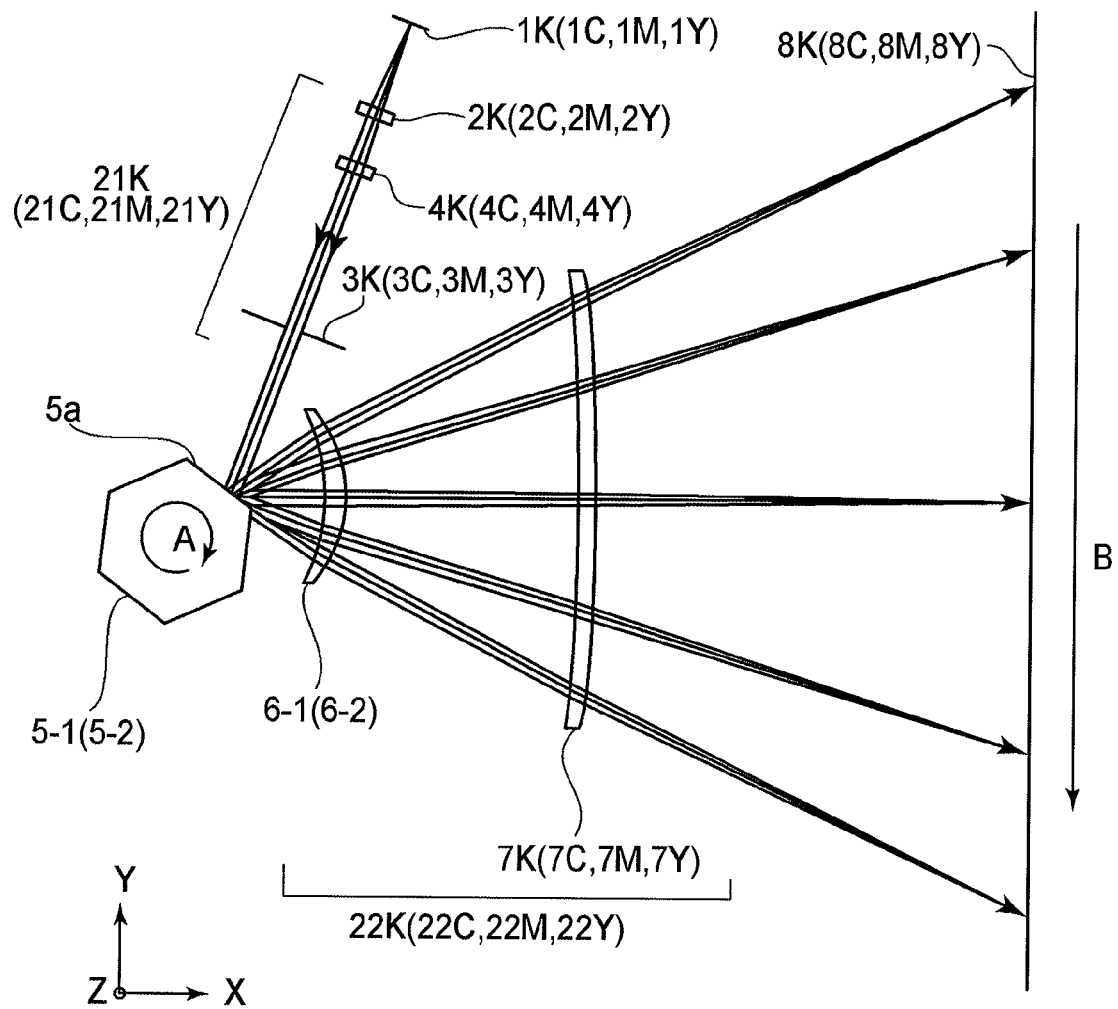
FIG. 1B is a main-scan sectional view of the first embodiment of the present invention.

FIG. 1B is a sectional view (main-scan sectional view) of a main portion of the optical system in the main-scan direction when one light path K1 (C1, M1, Y1) illustrated in FIG. 1A is developed.

In FIG. 1B, the mirrors illustrated in FIG. 1A are omitted.

In the following description, the term "main-scan direction" (Y-direction) refers to a direction in which a light beam is scanningly deflected by deflecting means.

The term "sub-scan direction" (Z-direction) refers to a direction which is parallel to the rotational axis of the deflecting means.

The term "main-scan section" refers to a plane with respect to which the rotational axis of the deflecting means is a normal.

The term "sub-scan section" refers to a plane with respect to which an axis in the main-scan direction (Y-direction) is a normal.

In FIG. 1A, the optical scanning device comprises two scanning units S1 and S2.

Since the first and second scanning units S1 and S2 have the same structure and optical function, the following description will be made mainly on the first scanning unit S1.

The components of the second scanning unit S2 corresponding to those of the first scanning unit S1 are denoted by reference numerals or characters with parentheses.

Furthermore, with regard to FIG. 1B, description will be made mainly on the optical system of the light path K1. The components of the optical systems of the light paths C1, M1 and Y1 corresponding to those of the light path K1 are denoted by reference numerals or characters with parentheses.

In the diagrams, denoted at 1K (1C, 1M, 1Y) is light source means which comprises a semiconductor laser (laser light source), for example. Denoted at 2K (2C, 2M, 2Y) is a condenser lens (collimator lens) which serves to convert a divergent light beam emitted from the light source means 1K (1C, 1M, 1Y) into a parallel light beam.

Denoted at 4K (4C, 4M, 4Y) is a cylindrical lens having a refracting power (power) only in the sub-scan direction (sub-scan section).

Denoted at 3K (3C, 3M, 3Y) is an aperture stop which functions to shape the beam profile of the light beam from the cylindrical lens 4K (4C, 4M, 4Y).

It is to be noted that the collimator lens 2K (2C, 2M, 2Y), cylindrical lens 4K (4C, 4M, 4Y) and aperture stop 3K (3C, 3M, 3Y) are components of an input optical system 21K (21C, 21M, 21Y).

The collimator lens 2K (2C, 2M, 2Y) and the cylindrical lens 4K (4C, 4M, 4Y) may be provided by a single optical element (anamorphic optical element).

Denoted at 5-1 (5-2) is an optical deflector as deflecting means which comprises a rotary polygonal mirror (polygon mirror), for example. It is rotated at a constant speed in the direction of an arrow A in the diagram, by driving means (not shown) such as a motor.

Denoted at 22K (22C, 22M, 22Y) is an imaging optical system having an fθ characteristic (fθ lens system), and it comprises first and second imaging lenses (anamorphic lenses 1 and 2) 6-1 (6-2) and 7K (7C, 7M, 7Y).

The imaging optical system 12K (12C, 12M, 12Y) functions to image the light beam scanningly deflected by the deflecting surface of the deflecting means 5-1 (5-2) upon a photosensitive drum surface 8K (8C, 8M, 8Y) to be described below.

Furthermore, the imaging optical system 22K (22C, 22M, 22Y) functions to provide a conjugate relationship between the deflecting surface 5a of the polygon mirror 5-1 (5-2) and the photosensitive drum surface 8K (8C, 8M, 8Y) within the sub-scan section, thereby to compensate the surface tilt of the deflecting surface.

Denoted at 8K (8C, 8M, 8Y) is a photosensitive drum (photosensitive drum surface) as the recording medium.

Denoted at 12K (11C, 12C, 12M, 11Y, 12Y) is a mirror (reflecting mirror) as a reflection member, and it is provided at the light path for directing the light beam emitted from the light source means 1K (1C, 1M, 1Y) to the photosensitive drum surface 8K (8C, 8M, 8Y).

Denoted at 9K (9C, 9M, 9Y) is a dust-proof glass.

Next, the operation of the first scanning unit S1 will be described.

It is to be noted that the operation of the second scanning unit S2 is similar to that of the first scanning unit S1.

In the first scanning unit S1, divergent light beams emitted from the light source means 1K and 1C (1M and 1Y), respectively, are converted into parallel light beams by the collimator lenses 2K and 2C (2M and 2Y), respectively.

Then, the converted light beams are respectively imaged as a line image being elongated in the main-scan direction upon the deflecting surface 5a of the polygon mirror (optical deflector) 5-1 (5-2) by the cylindrical lenses 4K and 4C (4M and 4Y), respectively.

Here, the light beam passing through the cylindrical lens 4K or 4C (4M or 4Y) goes through an aperture stop 3K or 3C (3M or 3Y) by which the beam width is restricted.

In this embodiment, in the sub-scan section, the optical axes of the collimator lenses 2K and 2C (2M and 2Y) and the optical axes of the cylindrical lenses 4K and 4C (4M and 4Y) are tilted with respect to a normal to the deflecting surface 5a of the polygon mirror 5-1 (5-2).

With this structure, the light beam emitted from each light source means 1K or 1C (1M or 1Y) is incident (oblique incidence) on the deflecting surface 5a of the polygon mirror 5-1 (5-2), with an angle from an oblique direction in the sub-scan direction (i.e., oblique incidence optical system).

The light beams deflected by the deflecting surface 5a of the polygon mirror 5-1 (5-2) go through a common first imaging lens 6-1 (6-2) (anamorphic lens 1) and, after that, these are divided by a mirror 11C (11Y) into two light fluxes.

The light beams thus divided pass corresponding a corresponding second imaging lens (anamorphic lens 2) 7K or 7C (7M or 7Y).

Subsequently, these are turned around by a corresponding mirror 12K or 12C (12M or 12Y), and are imaged on corresponding photosensitive drums (scan surfaces) 8K and 8C (8M, 8Y), in the shape of a spot.

By rotating the polygon mirror 5-1 (5-2) in a predetermined direction, the photosensitive drum surfaces 8K and 8C (8M and 8Y) are optically scanned, whereby the imagewise information is recorded thereon.

In the present embodiment, at the light paths K1 and C1 (M1 and Y1), the polarization direction of the light beams incident on the mirrors 12K, 11C and 12C (12M, 11Y, 12Y) is S-polarized, at the optical axis of the imaging optical system 22K (22C) (imaging lens).

On the other hand, with regard to the light beam scanningly deflected by the polygon mirror 5-1 (5-2), as the same optically scans the photosensitive drum surface 8K or 8C (8M or 8Y) sequentially from the axial area to the abaxial of the imaging optical system, the polarization direction of the light beam shifts from the S-polarized state.

Figure 2:
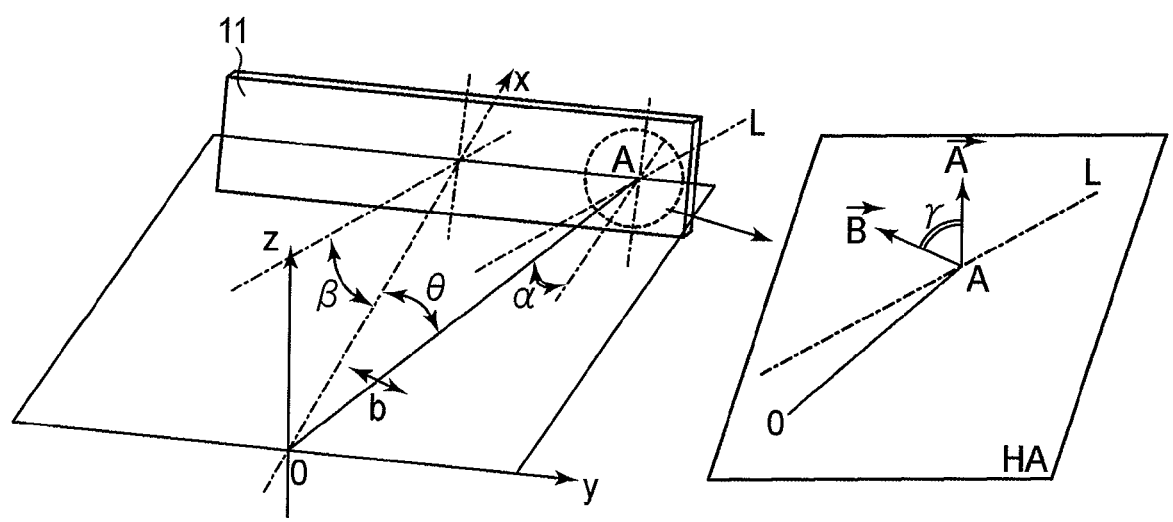
FIG. 2 is a schematic diagram showing a coordinate system in which a light beam is incident on a mirror.

This is because the rate of the P-polarized component increases as the scan angle becomes large. FIG. 2 illustrates the state of incidence of the light beams on the mirrors 12K, 11C and 12C (12M, 11Y, 12Y) at this time.

In FIG. 2, the plane containing the x-axis and y-axis is taken as a plane which contains the main-scan direction.

It is assumed here that the scanning light beam advances from the point O towards the point A, at an angle $\alpha$ with respect to the x-axis (the same direction as the axial light).

Here, the polarization direction of the light beam is in the direction perpendicular to a line OA, as depicted by an arrow b.

The angle $\alpha$ is the incidence angle on the mirror 11 in the main-scan direction.

The plane which contains the mirror 11 is disposed at an angle $\beta$ with respect to the x-axis, as shown in FIG. 2. Here, the angle $\beta$ is the incidence angle of the axial light beam on the mirror 11 in the sub-scan direction (i.e., axial incidence angle).

It is to be noted that, in FIG. 2, the mirror 11 is shown to represent the mirrors 12K, 11C and 12C (12M, 11Y and 12Y).

The S-polarized component lies in the direction of a normal vector of a plane which contains the points A and O and a normal L to the mirror 11. Using the reference characters shown in the diagram, the equation concerning this plane HA is expressed by:

$$x - y/\tan \alpha + \tan \beta \cdot z = 0 \quad (1)$$

If the normal vector of this plane HA is denoted by $A(\rightarrow)$, it follows that:

$$A(\rightarrow) = (1, -1/\tan \alpha, \tan \beta) \quad (2)$$

On the other hand, since the polarization direction component of the light beam is in the direction perpendicular to the segment OA, if this vector is denoted by $B(\rightarrow)$, it follows that:

$$B(\rightarrow) = (1, -1/\tan \alpha, 0) \quad (3)$$

In order to find the rate of the P-polarized component, it is necessary to find the sin component of the angle $\gamma$ defined by the vector $A(\rightarrow)$ and vector $B(\rightarrow)$.

Calculating this based on the inner product of the vector $A(\rightarrow)$ and vector $B(\rightarrow)$, from equations (2) and (3) it follows that:

$$\cos\gamma = \frac{A \cdot B}{|A||B|} = \frac{1 + 1/\tan^2\alpha}{\sqrt{(1 + 1/\tan^2\alpha)^2 + (1 + 1/\tan^2\alpha)\tan^2\beta}} \quad (4a)$$

$$\sin\gamma = \frac{\tan\beta}{\sqrt{1 + 1/\tan^2\alpha \tan^2\beta}} \quad (4b)$$

Since the intensity reflectance R of the mirror is the combination of the intensity reflectance Rs of the S-polarized component and the intensity reflectance Rp of the P-polarized component, the value of that can be expressed using the aforementioned variable y as a function, as follows.

$$R = R_s \cos^2\gamma + R_p \sin^2\gamma \quad (5)$$

From equation (5), if Rs=Rp, the intensity reflectance R will be R=Rs=Rp. If Rs≠Rp, on the other hand, it will have a value combined based on equation (5).

FIG. 3A illustrates the rate of the P-polarized component when in equation (4a) and equation (4b) the incidence angle $\alpha$ in the scan direction is changed.

It is seen from FIG. 3(A) that the rate of the P-polarized component increases as the angle $\alpha$ becomes large.

By using this relationship, the values of the intensity reflectances Rs and Rp are controlled based on the film forming condition at the time of the mirror production, for example, so as to accomplish the relationship Rp<Rs and to assure that the combined intensity reflectance R increases with the increase of the angle (scan angle) α.

Based on this, the shading on the scan surface is corrected.

Next, a case where plural mirrors are provided at the light path as in the preferred embodiment, will be considered.

In order to perform shading compensation on the photosensitive drum surface, it is necessary to suitably determine the film formation condition of an arbitrary mirror among the plural mirrors.

Here, FIG. 3B illustrates the rate of the P-polarized component when, in equation (4a) and equation (4b), the angle α is fixed while the angle β is changed.

It is seen from FIG. 3(B) that the rate of the P-polarized component increases as the incidence angle β to the mirror becomes large (becoming obtuse).

Here, the intensity reflectance R is equal to the square of the amplitude reflectance, and generally it can be expressed by the following expression using the S-polarized component Rs and P-polarized component Rp of the amplitude reflectance.

$$Rs = |rs|^2 = \left|\frac{n_1\cos i_1 - n_2\cos i_2}{n_1\cos i_1 + n_2\cos i_2}\right|^2 = \left|\frac{\sin(i_1 - i_2)}{\sin(i_1 + i_2)}\right|^2 \quad (6a)$$

$$Rp = |rp|^2 = \left|\frac{n_2\cos i_1 - n_1\cos i_2}{n_2\cos i_1 + n_1\cos i_2}\right|^2 = \left|\frac{\tan(i_1 - i_2)}{\tan(i_1 + i_2)}\right|^2 \quad (6b)$$

where $i_1$ and $i_2$ are the incidence angles and the refraction angle to the medium, respectively, and $n_1$ and $n_2$ are the refractive indices of the medium at the light entrance side and the light exit side thereof, respectively.

A metal material (e.g., aluminum, copper or chrome) is often used for the mirror surface to raise the reflectance of the mirror.

In such case, since the refractive index n2 of the medium at the light exit side in equation (6a) and equation (6b) is expressed in terms of a complex refractive index, these equations can be transformed into the following equations.

$$Rs = \frac{(a - n_1\cos i_i)^2 + b^2}{(a + n_1\cos i_1)^2 + b^2} \quad (7a)$$

$$Rp = Rs\frac{(a - n_1\sin i_1\tan i_1)^2 + b^2}{(a + n_1\sin i_1\tan i_1)^2 + b^2} \quad (7b)$$

Here, the parameter a and b are as follows ($k_2$ is the damping coefficient of the medium of the light exit side).

$$a^2 = \frac{1}{2}\left\{\sqrt{(n_2^2 - n_2^2 k_2^2 - n_1^2\sin^2 i_1)^2 + 4n_2^4 k_2^2} + (n_2^2 - n_2^2 k_2^2 - n_1^2\sin^2 i_1)\right\}$$

$$b^2 = \frac{1}{2}\left\{\sqrt{(n_2^2 - n_2^2 k_2^2 - n_1^2\sin^2 i_1)^2 + 4n_2^4 k_2^2} + (n_2^2 - n_2^2 k_2^2 - n_1^2\sin^2 i_1)\right\}$$

FIG. 4 illustrates the relationship in the intensity reflectance between the S-polarized light component and the P-polarized component with respect to the incidence angle when the medium at the light entrance side is an air ($n_1$=1) and the medium at the light exit side is aluminum ($n_2$=1.9 and $k_2$=7.0 at 800 nm).

It is seen from FIG. 4 that, if the incidence angle is small, there is a little difference between S-polarized component and the P-polarized component of the intensity reflectance R; on the other hand, as the incidence angle becomes large, the intensity reflectance of the S-polarized component becomes higher relative to the P-polarized component.

By combining such intensity reflectance characteristic with the ratio of the S-polarized component and the P-polarized component in the incidence angle as represented by equation (5) mentioned hereinbefore, the reflection surfaces of all the mirrors can have the same film structure.

Here, the words "same film structure" refer to that the film material, film thickness and number of the film layers are identical.

If the rate of the intensity reflectance (intensity reflectance ratio) of the axial intensity reflectance to the abaxial intensity reflectance is denoted by A, since the axial intensity reflectance is comprised of the S-polarized component only, from equation (5) the following equation is derived.

$$Rs_{(axial)} = A\{Rs_{(abaxial)}\cos^2\gamma + Rp_{(abaxial)}\sin^2\gamma\} \quad (8)$$

Since the S-polarized component of the intensity reflectance is not so different between the axial and the abaxial, if equation (8) is put together with respect to the intensity reflectance ratio A, it follows that:

$$A \approx 1/[1+(Rp_{(abaxial)}/Rs_{(abaxial)}-1)\sin^2\gamma] \quad (9)$$

Here, in a case where the film structure of the mirror is the same, the easiness of the shading compensation depending on the incidence angle onto the mirror will be considered.

Figure 5:
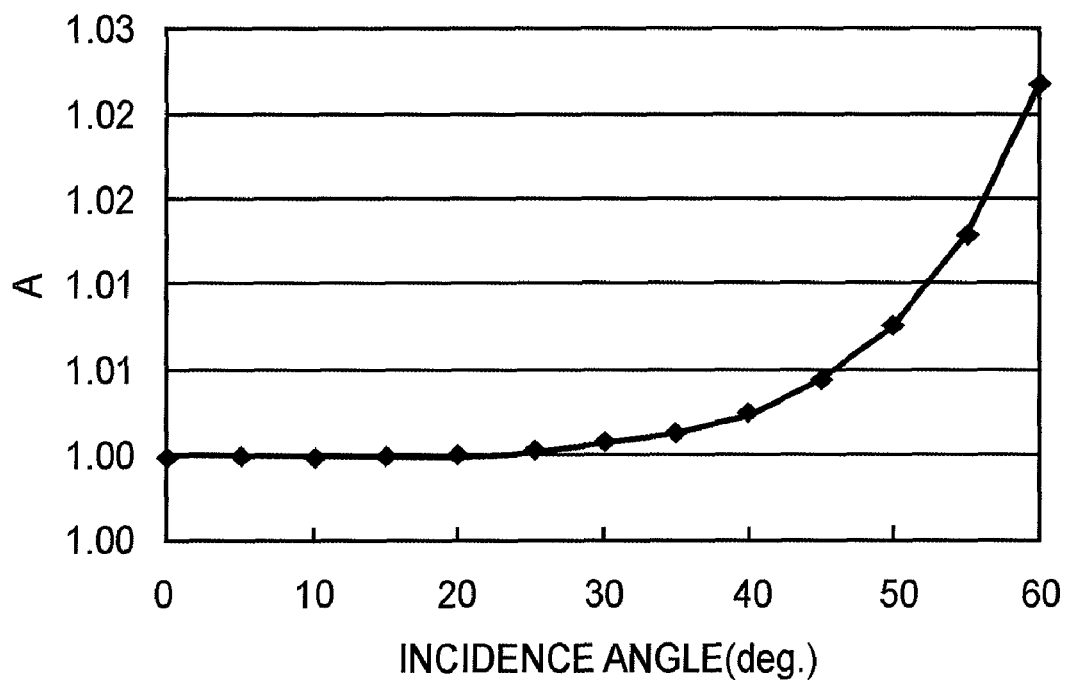
FIG. 5 is a graph showing the amount of shading compensation, differing with the difference of the sub-scan incidence angle on an aluminum monolayer mirror.

FIG. 5 illustrates the intensity reflectance ratio A to the incidence angle on the aluminum mirror, based on equation (9).

In the embodiment, the turn angle is two-fold of the incidence angle β.

If the incidence angle β to the mirror is small, namely, if the light path turn angle 2β is an acute angle, the sin component of equation (9) is small. Furthermore, since $Rp_{(abaxial)}/Rs_{(abaxial)}$ is close to 1 as shown in FIG. 4, the intensity reflectance ratio A will have a numerical value close to 1.

Thus, if the light path is bent to an acute angle, the shading compensation is almost unattainable.

If on the contrary the incidence angle β to the mirror becomes large, namely, when the light path turn angle 2β becomes obtuse, the sin component of equation (9) increases such that the contribution of the P/S polarized component ratio of the intensity reflectance increases.

In equation (9), it is seen that, the smaller the $Rp_{(abaxial)}/Rs_{(abaxial)}$ is, the larger the intensity reflectance ratio A becomes.

Furthermore, since as seen from FIG. 4 there is a tendency that, the larger the incidence angle β to the mirror is, the smaller the $Rp_{(abaxial)}/Rs_{(abaxial)}$ becomes. It is seen from this that, for the shading compensation, the light path turn angle 2β should be an obtuse angle.

Although the light path tuning may be different for respective light paths toward different photosensitive drums for the space saving of the optics box, all the mirrors can have the same film structure by appropriately setting the light path turn angle for each light path as described above.

As shown in FIG. 1A, in the light path K1 (M1), the path is turned by use of a single piece of mirror 12K (12M), whereas in the light path C1 (Y1), the path is turned by use of two pieces of mirrors 11C and 12C (11Y and 12Y), and by doing so, the optics box is made thin.

Here, since the incidence angle β to the mirror has to be an obtuse angle to accomplish the shading compensation, in the light path K1 (M1) the light path turning angle α is set to an obtuse angle.

In contrast, in the light path C1 (Y1), the turn angle β2 of one mirror is set to an obtuse angle so as to assure the shading compensation effect.

On the other hand, since the turn angle β1 of the other mirror in the sub-scan direction is set to an acute angle, this mirror does not have a shading compensation effect.

As a result of this structure, approximately the same shading compensation effect is provided at the light path K1 (M1) and the light path C1 (Y1), and thus the density uniformness of colors can be kept. Therefore, when colors are superposed, no color unevenness will be produced.

In other words, in light paths toward a plurality of photosensitive drums, color unevenness as different colors are superposed will be diminished if there is no large difference among the light paths in regard to the total of the light turn angles in each light path, throughout the whole effective scan region of the drum.

It is seen from FIG. 5 that, since the difference of the intensity reflectance ratio A is small if the difference of the incidence angle to the mirror is not greater than 20 degrees, the difference among the light paths in the total of the turn angles 2β in the sub-scan direction at the respective light paths should desirably be controlled to 20*2=40 degrees or less.

More specifically, in FIG. 1A, when the turn angle of the mirror 11C (11Y) in the sub-scan direction is denoted by β1, the turn angle of the mirror 12C (12Y) in the sub-scan direction is denoted by β2, and the turn angle of the mirror 12K (12M) in the sub-scan direction is denoted by α, then the following condition had better be satisfied throughout the whole area of the effective scan region.

|β1+β2|−|α|≦40 degrees

The effective scan region corresponds to the width in the main-scan direction between the image writing start position and the image writing finishing position of the light beam.

The number of mirrors for turning the light paths as in the present embodiment may be different, for the purpose of reducing the mirror number, for example.

In such case, with regard to the light path K1 (M1) having a fewer mirror number, for effective shading compensation, the light path turn angle 2β had better be made an obtuse angle.

It is seen From FIG. 5 that, if the incidence angle β to the mirror is not less 40 degrees, the intensity reflectance ratio A tends to become large. Thus, in the light path K1 (M1) having a fewer mirror number, the incidence angle β to at least one mirror had better be made 40 degrees or more.

Furthermore, with regard to the light path K1 (M1) having a fewer mirror number, the incidence angle β of at least one mirror should preferably be made equal to 45 degrees or more.

More specifically, at the light path K1 (M1) having a fewer mirror number, the turn angle 2β by at least one mirror had better be made an obtuse angle (96 degrees or more) having a large shading compensation effect.

On the other hand, with regard to the light path C1 (Y1) having a larger mirror number, in order to make small the shading compensation difference with the other light path, at least one mirror should desirably be configured to turn the light path at a turn angle 2β of an acute angle, having a small shading compensation effect.

Furthermore, it is seen from FIG. 5 that preferably both of the light path K1 (M1) having a fewer mirror number and the light path C1 (Y1) having a larger mirror number may have at least one mirror having a turn angle 2β of an obtuse angle. In that occasion, the shading compensation difference among the respective light paths can be easily made small.

The angular difference between the turn angle 2β of the mirror, which is an obtuse angle, provided at the light path K1 (M1) having a fewer mirror number and the turn angle 2β of the mirror, which is an obtuse angle, provided at the light path C1 (Y1) having a larger mirror number, may preferably be made equal to 20 degrees or less. In that occasion, the shading compensation difference among the respective light paths can easily be made small.

In this embodiment, the obtuse angle is defined as being not less than 90 degrees, and the acute angle is defined as being not greater than 90 degrees.

It is seen from FIG. 5 that, if the incidence angle β to the mirror is not greater than 30 degrees, the value of the intensity reflectance ratio A tends to become approximately 1. Thus, in the light path C1 (Y1) having a larger mirror number, the incidence angle β to at least one mirror had better be made equal to 30 degrees or less.

On the other hand, at the respective light paths K1 and C1 (M1 and Y1), in order to assure effective shading with use of by the same film structure, the membrane characteristic of the mirror has to be optimized as described below.

When the transmittance as light passes through an imaging lens is considered, since the light beam is incident in the scanning direction of the imaging lens, the transmittance as the P-polarized light is given by:

$$Tp = |tp|^2 = \left| \frac{4n_2 \cos i_1 \cos i_2}{(n_2 \cos i_1 + \cos i_2)^2} \right|^2 \quad (10)$$

$$= \left| \frac{4\cos i_1 \sqrt{n^2 - \sin^2 i_1}}{\left(\cos i_1 + \sqrt{n^2 - \sin^2 i_1}\right)^2} \right|^2$$

Figure 6:
FIG. 6 is a graph showing the axial to abaxial light quantity ratio, differing with the difference of the incidence angle on an imaging lens surface.

FIG. 6 illustrates the results of calculation of the transmittance of abaxial light, relative to the axial light, of the imaging optical system as the same is assumed as being planned, when based on equation (10) the incidence angle $i_1$ on the imaging lens surface is changed.

Here, the refractive index $n_2$ of the materials of imaging lens is 1.52 ("Zeonex E48R", 790 nm, available from Nippon Zeon Corporation).

It is seen from FIG. 6 that, the wider the incidence angle $i_1$ is to the imaging lens surface, the larger the abaxial transmittance is relative to the axial transmittance.

Furthermore, if a glass flat plate is disposed for dust protection, the light quantity difference of abaxial light to the axial light becomes larger.

In an ordinary imaging optical system, the incidence angle $i_1$ to the imaging lens surface can be supposed to be 0 degrees to 40 degrees. In such case, if the addition of a flat glass is taken into consideration, the light quantity difference of the abaxial light to the axial light will be around 6% at maximum, and this should be corrected by the mirror.

It is seen from FIG. 5 that, when the incidence angle β to the mirror is made greater than 40 to 50 degrees, the intensity reflectance ratio (shading compensation width) A can be made large.

If the incidence angle (abaxial incidence angle) of a light beam outside the optical axis, to the mirror, is denoted by δ, from the incidence angle β to the mirror in the sub-scan direction and the incidence angle α to the mirror in the main-scan direction, there is a relationship concerning this δ such as follows.

$$\cos \delta = \cos \alpha * \cos \beta$$

Based on this equation and equations (6a), (6b) and (4), the mirror membrane characteristic $Rp(\delta)/Rs(\delta)$ which satisfies the following conditional expression (11) should desirably be provided to assure that the intensity reflectance ratio A becomes equal to 1.01 to 1.06.

Namely, in the case of δ≧50 degrees:

$$0.94 \le 1 + \left(\frac{Rp(\delta)}{Rs(\delta)} - 1\right)\frac{1}{1+D} \le 0.99 \qquad (11)$$

where $$\frac{1}{D} = \left(1 - \frac{\cos^2 \delta}{\cos^2 \beta}\right)\tan^2 \beta$$

To the contrary, since there is little shading compensation quantity expected as far as the incidence angle δ of the light beam outside the optical axis, to the mirror, is not greater than 50 degrees, the mirror membrane characteristic $Rp(\delta)/Rs(\delta)$ which satisfies the following conditional expression (12) should desirably be provided to assure that the intensity reflectance ratio A becomes equal to 1.00 to 1.03.

Namely, in the case of δ≦50 degrees:

$$0.97 \le 1 + \left(\frac{Rp(\delta)}{Rs(\delta)} - 1\right)\frac{1}{1+D} \le 1.0 \qquad (12)$$

where $$\frac{1}{D} = \left(1 - \frac{\cos^2 \delta}{\cos^2 \beta}\right)\tan^2 \beta$$

Table 1 below shows the numerical values of the optical system of the first embodiment.

Figure 7A:
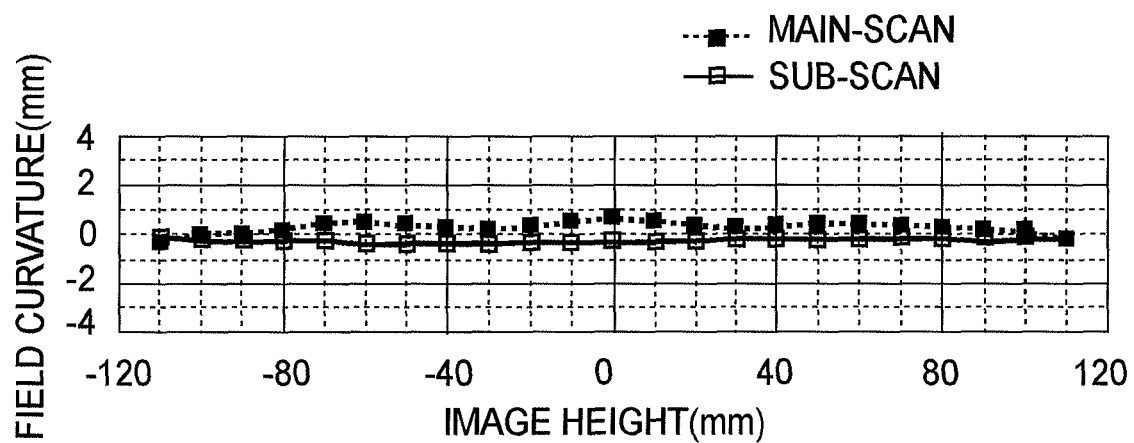
FIG. 7A is a graph showing the field curvature in the first embodiment of the present invention.

FIG. 7A illustrates the field curvature on the scan surface of the optical system of the first embodiment.

Figure 7B:
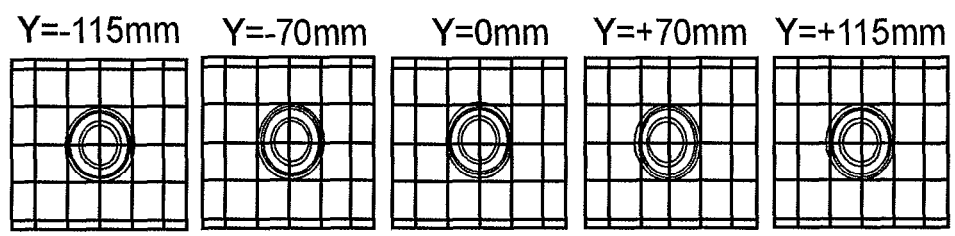
FIG. 7B is a diagram illustrating spot shapes on the scan surface, in the first embodiment of the present invention.

FIG. 7B illustrates the spot shape on the scan surface (contours at 5%, 10%, 13.5%, 36.8% and 50% of the peak light quantity) on the scan surface, by the optical system of the first embodiment.

TABLE 1

| Basic Features | | |
|---|---|---|
| Used Wavelengths | λ(nm) | 790 |
| Scan Angle | θ(deg) | 34.13 |
| F-theta Coefficient | f | 188.000 |
| Polygon Circumscribed Circle Diameter | R(mm) | 20 |
| No. of Polygon Surfaces | M | 6 |
| Sub-Scan Direction Incidence Angle | ε(deg) | 2.5 |
| Deflection Direction Incidence Angle | γ(deg) | 70 |
| Input System Arrangement | | |
| Light Source to Cylindrical Lens 4 Distance | d1(mm) | 21.0 |
| Cylindrical Lens 4 Center Thickness | d2(mm) | 3.0 |
| Cylindrical Lens 4 to Cylindrical Lens 20 Distance | d3(mm) | 16.8 |
| Cylindrical Lens 20 Center Thickness | d4(mm) | 3.0 |
| Cylindrical Lens 20 to Deflecting Surface Distance | d5(mm) | 107.3 |
| Collimator Lens Refractive Index | n1 | 1.76167 |
| Cylindrical Lens Refractive Index | n2 | 1.52397 |

TABLE 1-continued

| | | Meridional R | | Sagittal r | |
|---|---|---|---|---|---|
| | | 1st Surface | 2nd Surface | 1st Surface | 2nd Surface |
| Cylindrical Lens | | infinite | infinite | 10.27 | infinite |
| Collimator Lens | | 30.47 | infinite | *** | *** |
| Scanning System Arrangement | | | | | |
| Deflection Surface to Anamorphic Lens 1 Distance | | D1(mm) | | 26.0 | |
| Anamorphic Lens 1 Center Thickness | | D2(mm) | | 6.0 | |
| Anamorphic Lens 1 to Anamorphic Lens 2 Distance | | D3(mm) | | 63.0 | |
| Anamorphic Lens 2 Center Thickness | | D4(mm) | | 4.0 | |
| Anamorphic Lens 2 to Scan Surface Distance | | D5(mm) | | 121.0 | |
| Anamorphic Lens 1 Refractive Index | | n3 | | 1.52397 | |
| Anamorphic Lens 2 Refractive Index | | n4 | | 1.52397 | |
| | | Meridional R | | Sagittal r | |
| | | 1st Surface | 2nd Surface | 1st Surface | 2nd Surface |
| Anamorphic Lens 1 | | −46.81 | −31.56 | 1000.00 | 1000.00 |
| Anamorphic Lens 2 | | −707.80 | 966.60 | 188.05 | −32.75 |

Figure 8:
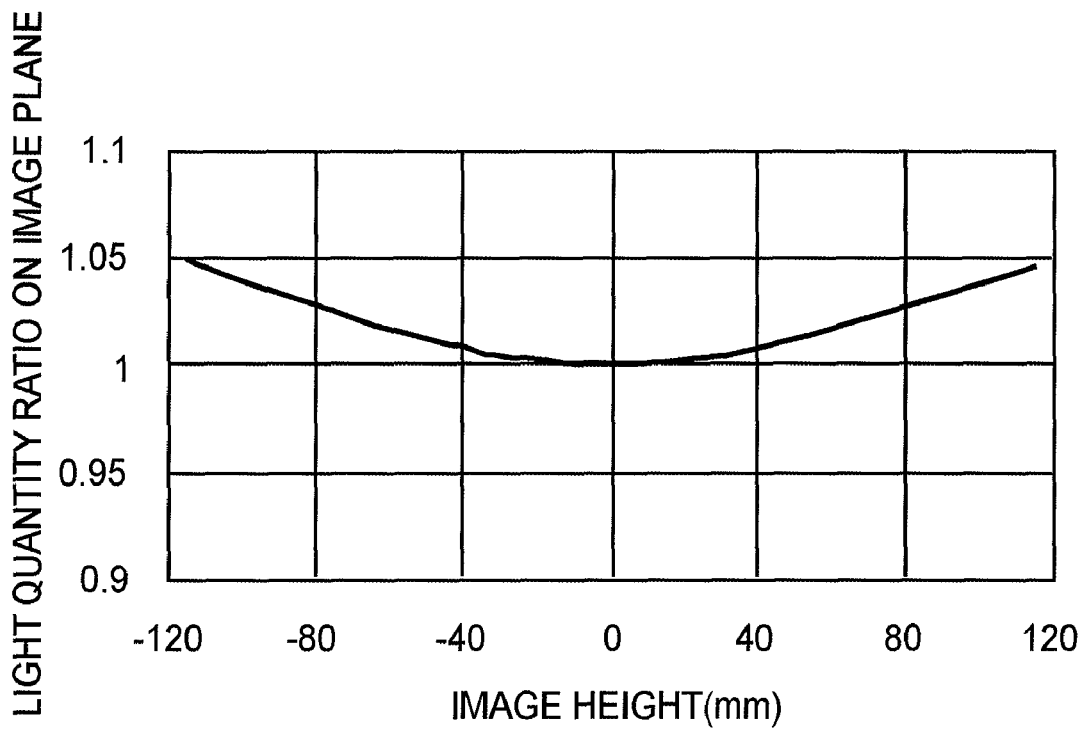
FIG. 8 is a graph showing the shading on the scan surface, in the first embodiment of the present invention.

FIG. 8 shows the light quantity distribution when, in the optical system of the present embodiment, the light has passed through the imaging optical system and a dust-proof glass.

It is seen from FIG. 8 that the abaxial light quantity is raised by around +4.4% to the axial light quantity.

In order to correct this light quantity difference, the angles for turning the light paths are set such as shown in Table 2, respectively.

TABLE 2

| | Light Path C1 (Y1) | | Light Path K1 (M1) |
|---|---|---|---|
| | Mirror 11C Mirror 11Y | Mirror 12C Mirror 12Y | Mirror 12K Mirror 12M |
| Axial Incidence Angle | 15.1(deg) | 54.4(deg) | 54.4(deg) |
| Abaxial Incidence Angle | 31.9(deg) | 58.5(deg) | 58.5(deg) |

Figure 9:
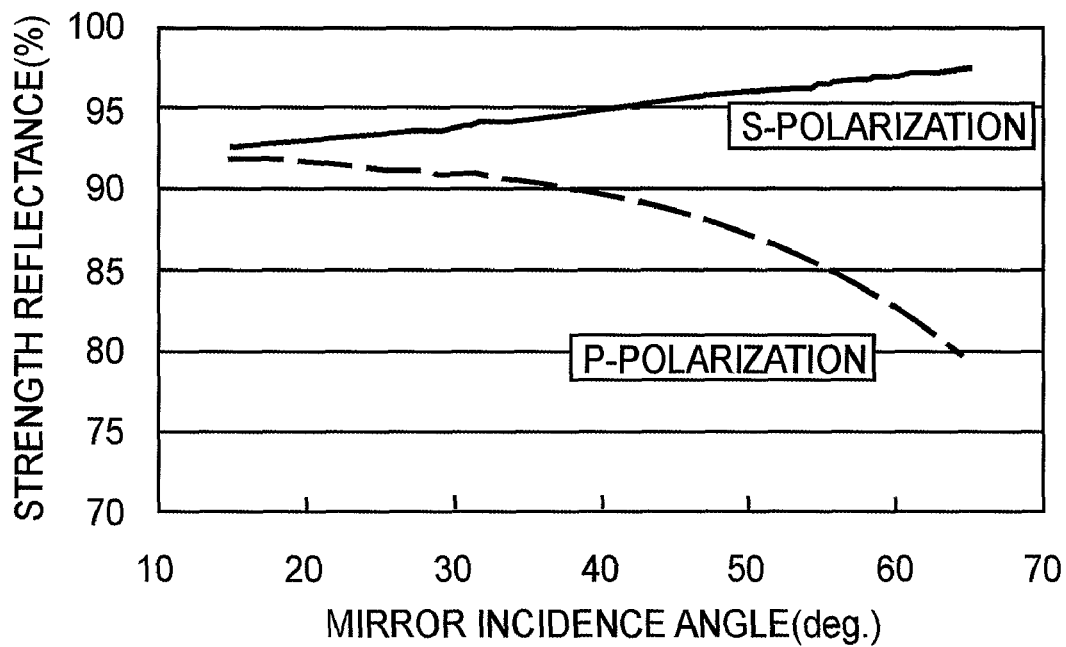
FIG. 9 is a graph showing the angular characteristic of reflectance of the mirror, in the first embodiment of the present invention.

FIG. 9 illustrates the P-polarized component and S-polarized component of the intensity reflectance to the mirror incidence angle, with respect to the mirror used in the present embodiment.

The S-polarized component of the intensity reflectance at the incidence angle 15.1 degrees (axial incidence angle) of the mirror 11C (11Y) is 92.4%.

Furthermore, the P-polarized component of the intensity reflectance at the incidence angle 31.9 degrees (abaxial incidence angle) is 90.6%, and the S-polarized light component is 93.9%.

The ratio between the P-polarized component and the S-polarized component of the intensity reflectance R at the incidence angle to the mirror of 31.9 degrees is 0.016:0.984. Thus, the intensity reflectance R at 31.9 degrees is:

$$R = 0.016*90.6 + 0.984*93.9 = 93.865\%$$

Hence, it has been raised by around 1.5% to the axial ray (15.1 degrees).

On the other hand, the S-polarized light component of the intensity reflectance at the incidence angle 54.4 degrees (axial incidence angle) of the mirror 12C (12Y) and the mirror 12K (12M) is 96.3%.

Furthermore, the P-polarized component of the intensity reflectance R at the incidence angle 58.5 degrees (abaxial incidence angle) is 83.6%, while the S-polarized light component is 96.7%.

The ratio between the P-polarized component and the S-polarized component of the intensity reflectance at the incidence angle to the mirror of 58.5 degrees is 0.273:0.727. Thus, the intensity reflectance R at 58.5 degrees is:

$$R=273*83.6+0.727*96.7=93.134\%$$

Hence, it has been lowered by around 3.3% to the axial ray (54.4 degrees).

Therefore, with regard to the light path C1 (Y1), as the light goes via the imaging lens, dust-proof glass and mirror, the abaxial light quantity is lowered relative to the axial light quantity to about +4.4% to +1.1%.

Furthermore, with regard to the light path K1 (M1) as well, similarly the abaxial light quantity is lowered relative to the axial light quantity to about +4.4% to +2.4%.

Generally, color unevenness is diminished if the difference between the axial and abaxial light quantities is less than 3%. Thus, even if mirrors having the same film structure are used, satisfactory shading compensation can be accomplished.

With regard to the light path C1 (Y1), it has mirrors of a number larger by one than that of the light path K1 (M1). Thus, for this light path C1 (Y1), the incidence angle (axial incidence angle) of the mirror 11C (11Y) is made equal to 30 degrees or less. By doing so, the amount of shading compensation is controlled to be small.

On the other hand, with regard to the light path K1 (M1), in order to accomplish the shading compensation with use of a single piece of mirror, the incidence angle (axial incidence angle) to the mirror 12K (12M) is made equal to 45 degrees or more.

Furthermore, the total of the angles 2β for turning the light paths is equal to 138.9 degrees with regard to the light path C1 (Y1), while it is equal to 108.8 degrees with regard to the light path K1 (M1). Thus, by keeping the difference in the total turn angle in the sub-scan direction at 40 degrees or less, the color unevenness is well diminished.

Now, the conditional expression (11) will be calculated with regard to the membrane characteristic of the mirror illustrated in FIG. 9.

From Table 2, the incidence angle β to the mirror of the axial light beam of the imaging optical system, the incidence angle δ to the mirror of the abaxial light beam, the reflectance Rs(δ) as S-polarized light is incident on the mirror at an incidence angle δ, and the reflectance Rp(δ) as P-polarized light is incident at an incidence angle δ are as follows.

β=54.4 degrees
δ=58.5 degrees
Rp(δ)=83.6%
Rs(δ)=96.7%

If these values are substituted into conditional expression (11), it follows that:
Ans=0.949,
and this satisfies conditional expression (11).

Furthermore, calculation will now be made with regard to the conditional expression (12).

From Table 2, the incidence angle β to the mirror of the axial light beam of the imaging optical system, the incidence angle δ to the mirror of the abaxial light beam, the reflectance Rs(δ) as S-polarized light is incident on the mirror at an incidence angle δ, and the reflectance Rp(δ) as P-polarized light is incident at an incidence angle δ are as follows.

β=15.1 degrees
δ=31.9 degrees
Rp(δ)=90.6%
Rs(δ)=93.9%

If these values are substituted into conditional expression (12), it follows that:
Ans=0.999,
and this satisfies conditional expression (12).

It is the present embodiment as described above, even in a system in which the light path is turned by mirrors such as described above, by optimizing the film structure and the light path turn angles of the mirrors, all the mirrors can have the same film structure (film layer number, film material and film layer thickness).

Furthermore, even in a system in which light paths are turned in different ways in relation to plural photosensitive drums, mirrors of same film structure can be used. Thus, based on this, even if the number of used mirrors increases, the manufacture is facilitated and the shading compensation can be done assuredly.

Furthermore, in accordance with this embodiment, the overall system can be made compact and yet high-speed printing is enabled.

Embodiment 2

Figure 10A:
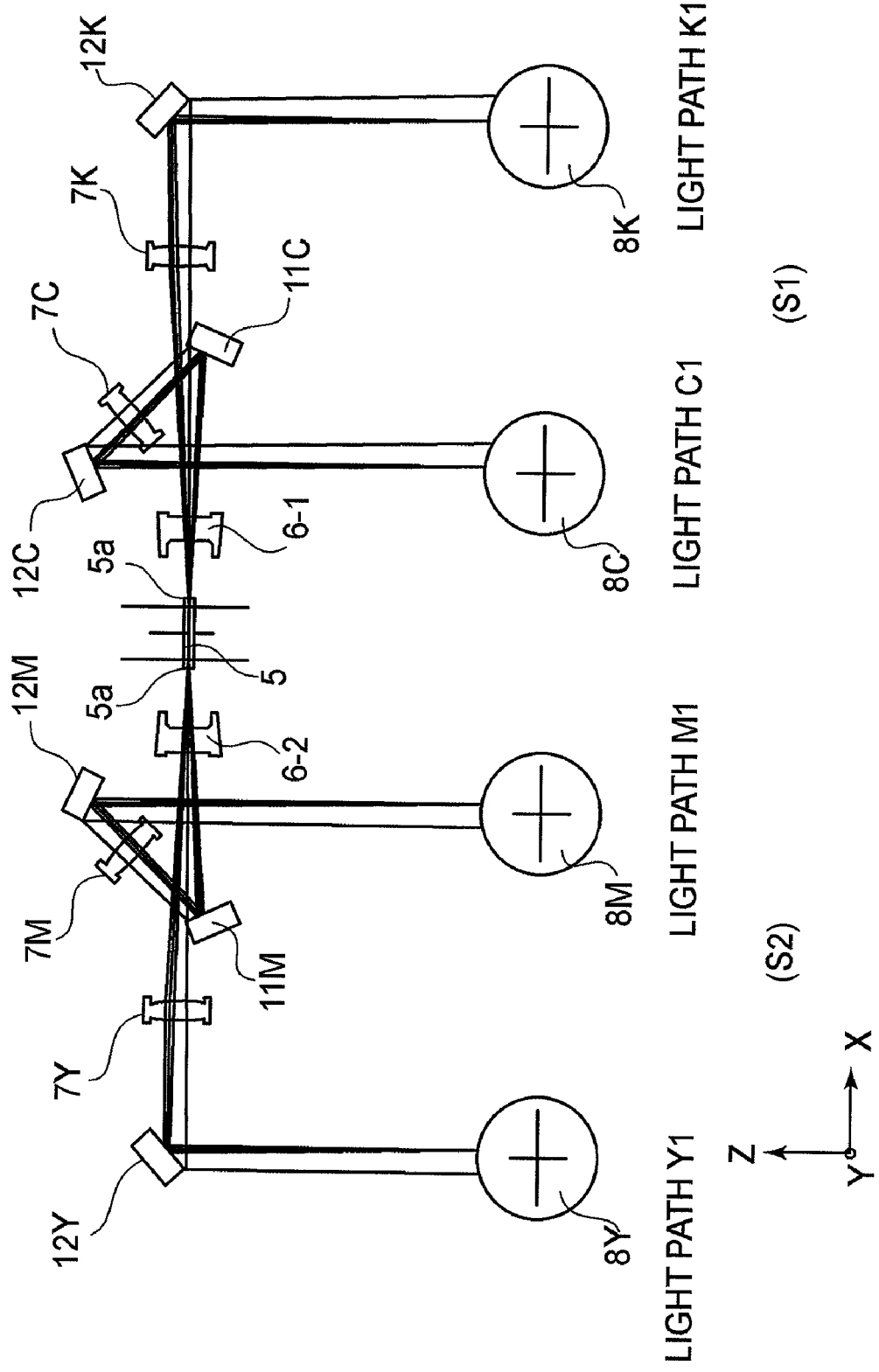
FIG. 10A is a sub-scan sectional view of a second embodiment of the present invention.

FIG. 10A is a sectional view (sub-scan sectional view) of a main portion of a second embodiment of the present invention, along the sub-scan direction.

Figure 10B:
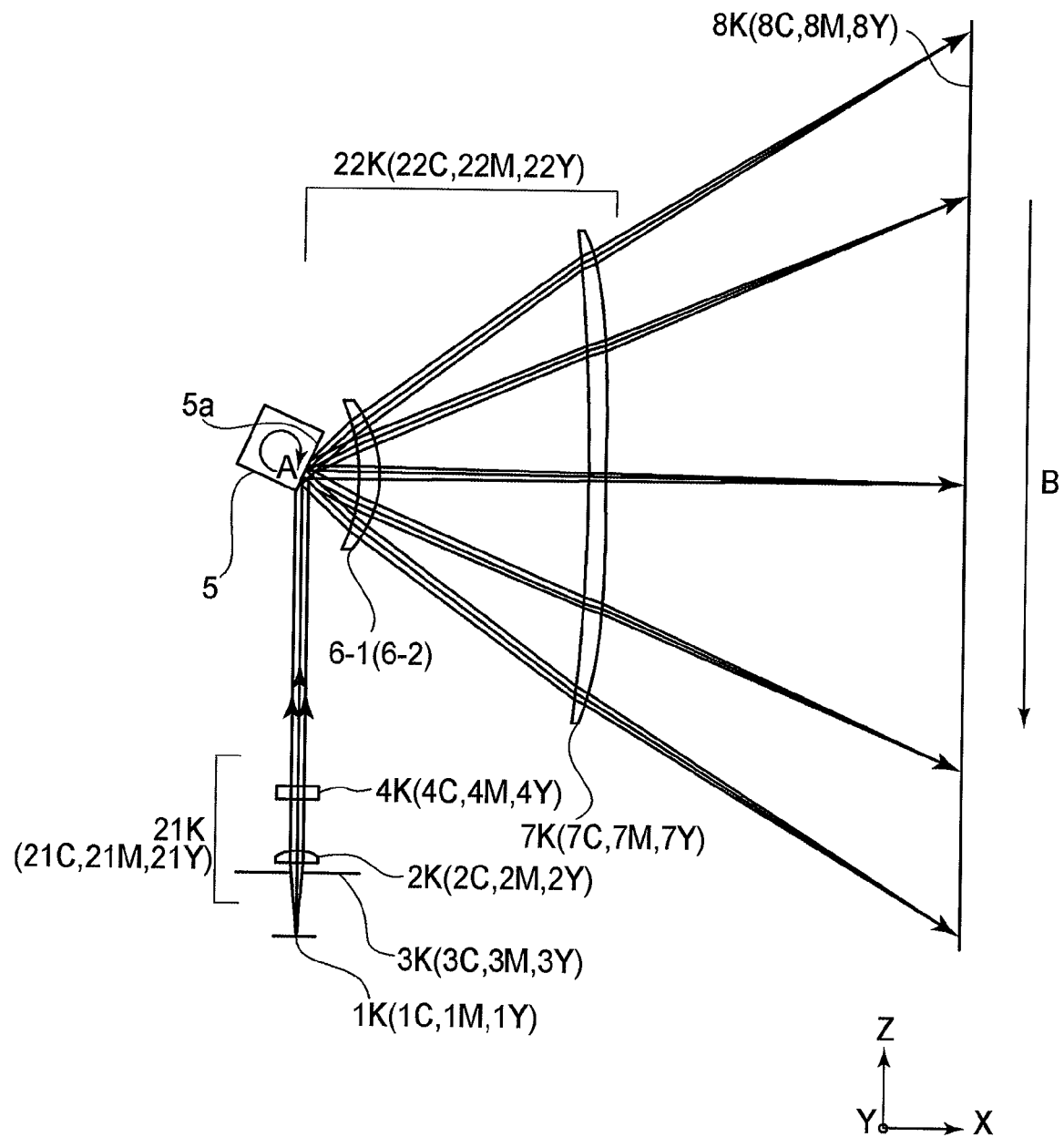
FIG. 10B is a main-scan sectional view of the second embodiment of the present invention.

FIG. 10B is a sectional view (main-scan sectional view) of a main portion of the optical system in the main-scan direction when one light path K1 (C1, M1, Y1) illustrated in FIG. 10A is developed.

In FIGS. 10A and 10B, like numerals are assigned to components corresponding to those shown in FIGS. 1A and 1B.

This embodiment differs from the first embodiment in that the polygon mirror 5 as the deflecting means is comprised of a single element which is shared by two scanning units S1 and S2, and that, depending on this structure, the light paths are turned in different a manner.

The structure and optical function of the remaining portion of this embodiment are similar to the first embodiment, and hence similar advantageous results are obtained.

In the embodiment, at the light paths K1 and C1 (M1 and Y1), the polarization direction of the light beams incident on the mirrors 12K, 11C and 12C (12M, 11Y and 12Y) is S-polarized at the optical axial of the imaging optical system 22K (22C) (imaging lens).

In the embodiment, the turn angle is two-fold of the incidence angle.

Table 3 below shows the numerical values of the optical system of the second embodiment.

Figure 11A:
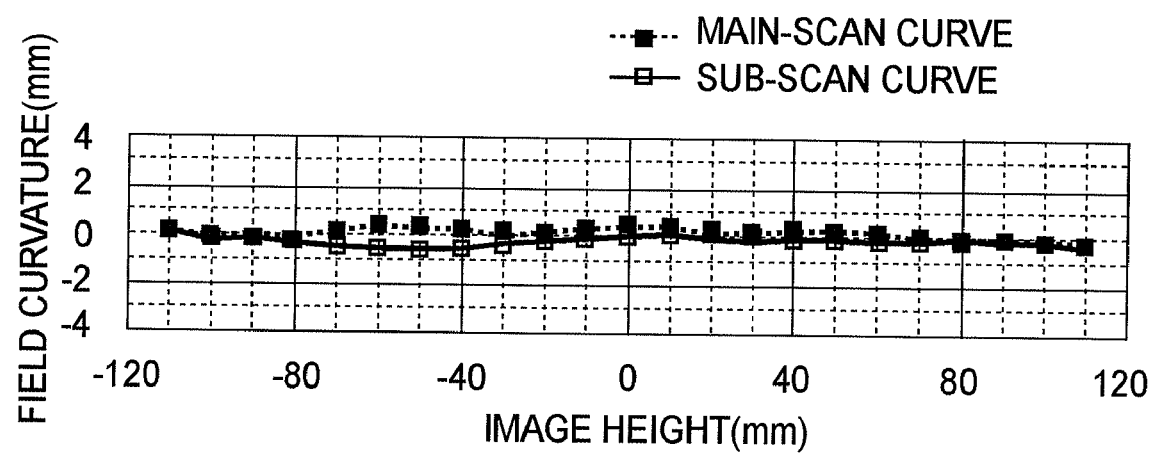
FIG. 11A is a graph showing the field curvature, in the second embodiment of the present invention.

FIG. 11A illustrates the field curvature on the scan surface of the optical system of the second embodiment.

Figure 11B:
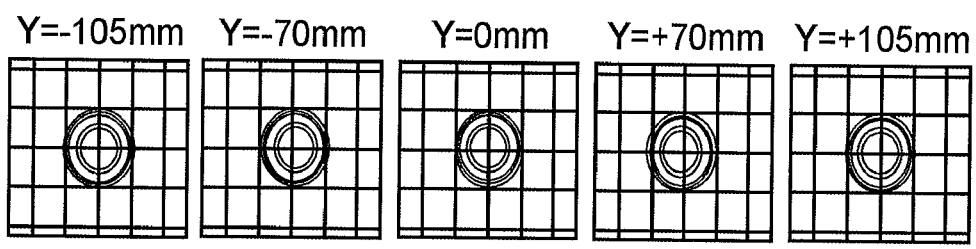
FIG. 11B is a diagram illustrating spot shapes on the scan surface, in the second embodiment of the present invention.

FIG. 11B illustrates the spot shape on the scan surface (contours at 5%, 10%, 13.5%, 36.8% and 50% of the peak light quantity) on the scan surface, by the optical system of the second embodiment.

TABLE 3

| Basic Features | | |
|---|---|---|
| Used Wavelengths | λ(nm) | 790 |
| Scan Angle | θ(deg) | 44.38 |
| f-theta Coefficient | f | 142.000 |
| Polygon Circumscribed Circle Diameter | R(mm) | 10 |
| No. of Polygon Surfaces | M | 4 |
| Sub-Scan Direction Incidence Angle | ε(deg) | 3 |
| Deflection Direction Incidence Angle | γ(deg) | 90 |

TABLE 3-continued

Input System Arrangement

| | | |
|---|---|---|
| Light Source to Collimator Lens Distance | d1(mm) | 18.3 |
| Collimator Lens Center Thickness | d2(mm) | 3.0 |
| Collimator Lens to Cylindrical Lens Distance | d3(mm) | 12.7 |
| Cylindrical Lens Center Thickness | d4(mm) | 3.0 |
| Cylindrical Lens to Deflecting Surface Distance | d5(mm) | 77.0 |
| Collimator Lens Refractive Index | n1 | 1.76167 |
| Cylindrical Lens Refractive Index | n2 | 1.52397 |

| | Meridional R | | Sagittal r | |
|---|---|---|---|---|
| | $1^{st}$ Surface | $2^{nd}$ Surface | $1^{st}$ Surface | $2^{nd}$ Surface |
| Cylindrical Lens | infinite | −15.22 | *** | *** |
| Collimator Lens | infinite | infinite | 40.35 | infinite |

Scanning System Arrangement

| | | |
|---|---|---|
| Deflection Surface to Anamorphic Lens 1 Distance | D1(mm) | 13.5 |
| Anamorphic Lens 1 Center Thickness | D2(mm) | 5.0 |
| Anamorphic Lens 1 to Anamorphic Lens 2 Distance | D3(mm) | 50.5 |
| Anamorphic Lens 2 Center Thickness | D4(mm) | 4.0 |
| Anamorphic Lens 2 to Scan Surface Distance | D5(mm) | 98.0 |
| Anamorphic Lens 1 Refractive Index | n3 | 1.52397 |
| Anamorphic Lens 2 Refractive Index | n4 | 1.52397 |

| | Meridional R | | Sagittal r | |
|---|---|---|---|---|
| | $1^{st}$ Surface | $2^{nd}$ Surface | $1^{st}$ Surface | $2^{nd}$ Surface |
| Anamorphic Lens 1 | −34.23 | −23.56 | 1000.00 | 1000.00 |
| Anamorphic Lens 2 | −524.26 | 863.88 | 55.02 | −32.07 |

Figure 12:
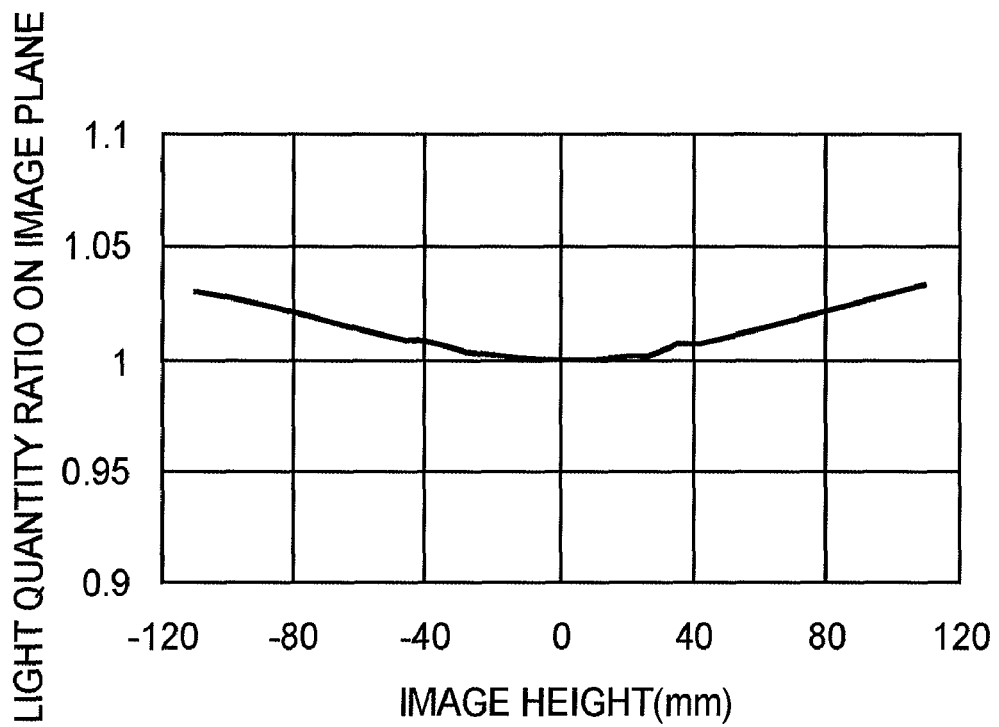
FIG. 12 is a graph showing the shading on the scan surface, in the second embodiment of the present invention.

FIG. 12 shows the light quantity distribution when, in the optical system of the present embodiment, the light has passed through the imaging optical system and a dust-proof glass.

It is seen from FIG. 12 that the abaxial light quantity is raised by around +3.0% to the axial light quantity.

In order to correct this light quantity difference, the angles for turning the light paths are set such as shown in Table 4, respectively.

TABLE 4

| | Light Path C1 (M1) | | Light Path K1 (Y1) |
|---|---|---|---|
| | Mirror 11C Mirror 11M | Mirror 12C Mirror 12M | Mirror 12K Mirror 12Y |
| Axial Incidence Angle | 21.0(deg) | 21.0(deg) | 44.6(deg) |
| Abaxial Incidence Angle | 42.4(deg) | 42.4(deg) | 52.7(deg) |

Figure 13:
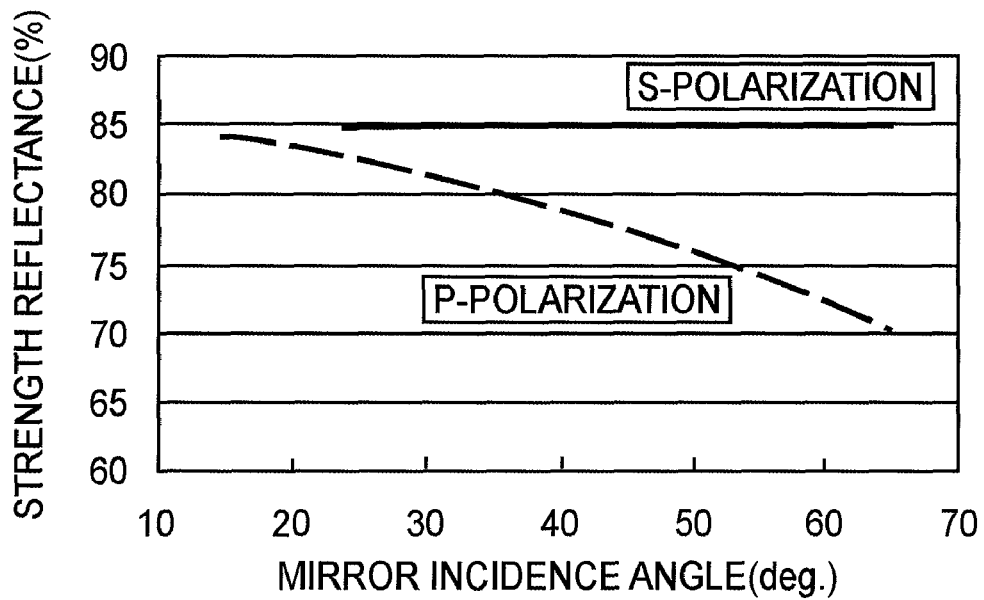
FIG. 13 is a graph showing the angular characteristic of reflectance of the mirror, in the second embodiment of the present invention.

FIG. 13 illustrates the P-polarized component and S-polarized component of the intensity reflectance to the mirror incidence angle, with respect to the mirror used in the present embodiment.

The S-polarized component of the intensity reflectance R at the incidence angle 21.0 degrees (axial incidence angle) of the mirror 11C (11Y) and mirror 12C (12M) is 85.0%.

Furthermore, the P-polarized component of the intensity reflectance at the incidence angle 42.4 degrees (abaxial incidence angle) is 78.2%, and the S-polarized light component is 84.8%.

The ratio between the P-polarized component and the S-polarized component of the intensity reflectance R at the incidence angle to the mirror of 42.4 degrees is 0.052:0.948.

Thus, the intensity reflectance R at 42.4 degrees is:

$$R=0.052*78.2+0.948*84.8=84.454\%$$

Hence, it has been lowered by around 0.6% to the axial ray (21.0 degrees).

On the other hand, the S-polarized light component of the intensity reflectance at the incidence angle 44.6 degrees (axial incidence angle) of the mirror 12K (12Y) is 84.8%.

Furthermore, the P-polarized component of the intensity reflectance at the incidence angle 52.7 degrees (abaxial incidence angle) is 74.9%, while the S-polarized light component is 84.8%.

The ratio between the P-polarized component and the S-polarized component of the intensity reflectance at the incidence angle to the mirror of 52.7 degrees is 0.267:0.733. Thus, the intensity reflectance R at 52.7 degrees is:

$$R=0.267*74.9+0.733*84.8=82.183\%$$

Hence, it has been lowered by around 3.1% to the axial ray (44.6 degrees).

Therefore, with regard to the light path C1 (M1), as the light goes via the imaging lens and mirror, the abaxial light quantity is lowered relative to the axial light quantity to about +3.0% to +1.7%.

Furthermore, with regard to the light path K1 (Y1) as well, similarly the abaxial light quantity is lowered relative to the axial light quantity to about +3.0% to −0.2%.

Generally, color unevenness is diminished if the difference between the axial and abaxial light quantities is less than 3%. Thus, even if mirrors having the same film structure are used, satisfactory shading compensation can be accomplished.

With regard to the light path C1 (M1), it has mirrors of a number larger by one than that of the light path K1 (Y1). Thus, for this light path C1 (M1), the incidence angle (axial incidence angle) of the mirror 11C (11M) and the mirror 12C (12M) is made equal to 30 degrees or less. By doing so, the amount of shading compensation is controlled to be small.

On the other hand, with regard to the light path K1 (Y1), in order to accomplish the shading compensation with use of a single piece of mirror, the incidence angle (axial incidence angle) to the mirror 12K (12Y) is made equal to 45 degrees or more.

Furthermore, the total of the angles $2\beta$ for turning the light paths is equal to 89.2 degrees with regard to the light path K1 (Y1), while it is equal to 84.0 degrees with regard to the light path C1 (M1). Thus, by keeping the difference in the total turn angle in the sub-scan direction at 40 degrees or less, the color unevenness is well diminished.

Now, the conditional expression (11) will be calculated with regard to the membrane characteristic of the mirror illustrated in FIG. 13. From Table 4, the incidence angle β to the mirror of the axial light beam of the imaging optical system, the incidence angle δ to the mirror of the abaxial light beam, the reflectance Rs(δ) as S-polarized light is incident on the mirror at an incidence angle δ, and the reflectance Rp(δ) as P-polarized light is incident at an incidence angle δ are as follows.

β=44.6 degrees
δ=52.7 degrees
Rp(δ)=74.9%
Rs(δ)=84.8%

If these values are substituted into conditional expression (11), it follows that:
Ans=0.969,
and this satisfies conditional expression (11).

Furthermore, calculation will now be made with regard to the conditional expression (12).

From Table 4, the incidence angle β to the mirror of the axial light beam of the imaging optical system, the incidence angle δ to the mirror of the abaxial light beam, the reflectance Rs(δ) as S-polarized light is incident on the mirror at an incidence angle δ, and the reflectance Rp(δ) as P-polarized light is incident at an incidence angle δ are as follows.

β=21.0 degrees
δ=42.4 degrees
Rp(δ)=78.2%
Rs(δ)=84.8%

If these values are substituted into conditional expression (12), it follows that:

Ans=0.996, and this satisfies conditional expression (12).

Embodiment of Image Forming Apparatus

Figure 14:
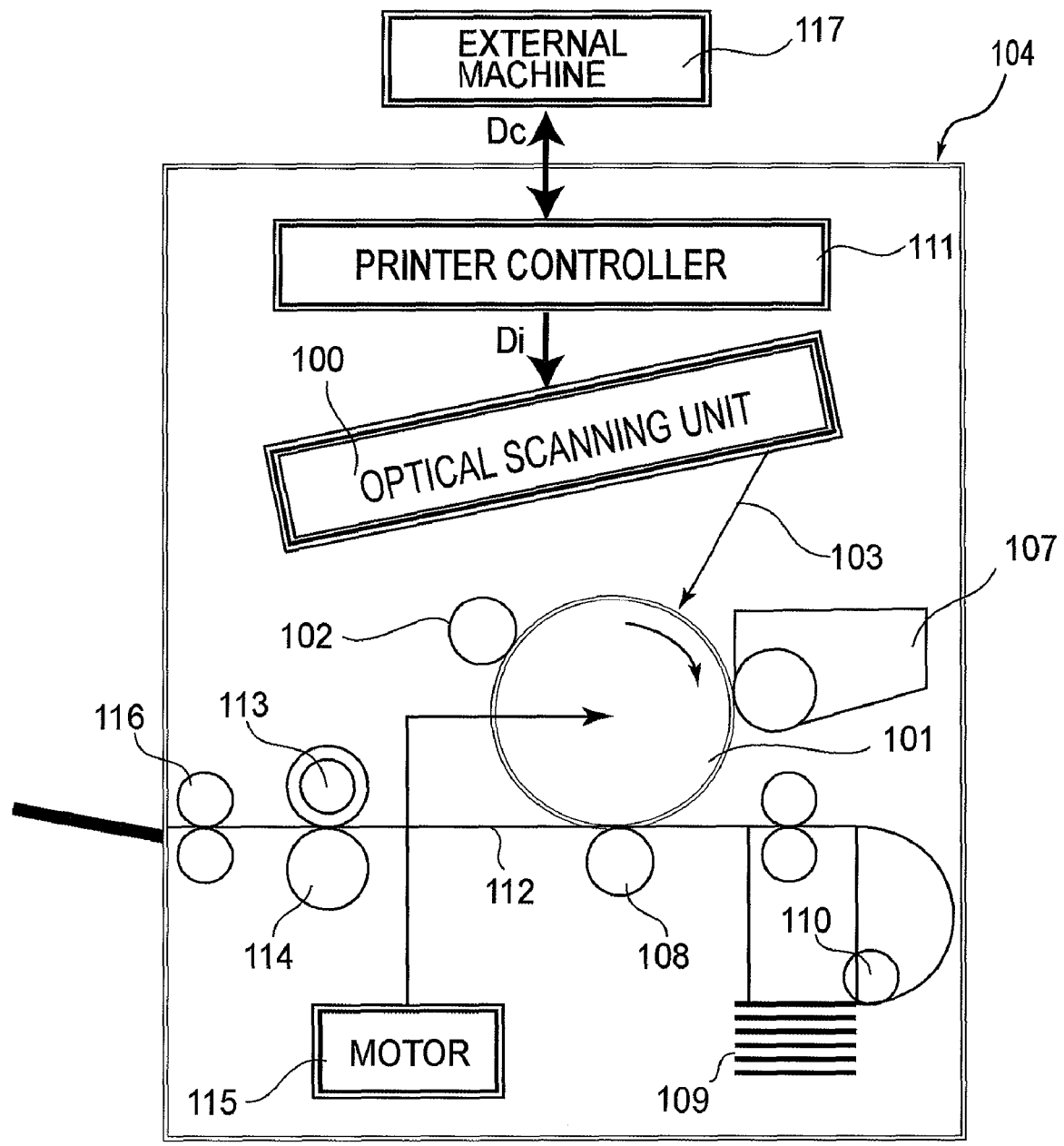
FIG. 14 is a sub-scan sectional view of an image forming apparatus according to an embodiment of the present invention.

FIG. 14 is a schematic and sectional view, in the sub-scan direction, of a main portion of an image forming apparatus according to an embodiment of the present invention. Denoted generally at 104 in the drawing is the image forming apparatus.

The image forming apparatus 104 receives code data Dc supplied thereto from an external machine 117 such as a personal computer, for example. The code data Dc is then transformed by a printer controller 111 inside the apparatus, into imagewise data (dot data) Di.

The imagewise data Di is then inputted into an optical scanning unit (optical scanning device) 100 which is configured in accordance with any one of the first and second embodiments described hereinbefore. The optical scanning unit 100 produces a light beam 103 having been modulated in accordance with the imagewise data Di, and with this light beam 103, the photosensitive surface of a photosensitive drum 101 is scanned in the main-scan direction.

The photosensitive drum 101 which is an electrostatic latent image bearing member (photosensitive member) is rotated clockwise by means of a motor 115. Through this rotation, the photosensitive surface of the photosensitive drum 101 is moved relatively to the light beam 103, in the sub-scan direction which is orthogonal to the main-scan direction.

Disposed just above the photosensitive drum 101 is a charging roller 102 which is in contact with the photosensitive drum surface to electrically charge the drum surface uniformly. Onto the photosensitive drum 101 surface having been electrically charged by the charging roller 102, the light beam 103 being scanned by the optical scanning unit 100 is projected.

As described above, the light beam 103 has been modulated in accordance with the imagewise data Di. By irradiating the photosensitive drum 101 with this light beam 103, an electrostatic latent image is formed on the photosensitive drum 101 surface. The electrostatic latent image thus formed is then developed into a toner image, by means of a developing device 107 which is provided at a position downstream of the irradiation position of the light beam 103 with respect to the rotational direction of the photosensitive drum 101 and which is in contact with the photosensitive drum 101.

The toner image thus developed by the developing device 107 is transferred onto a transfer sheet (transfer material) 112 below the photosensitive drum 101, by means of a transfer roller 108 which is disposed opposed to the photosensitive drum 101.

Transfer sheets 112 are stored in a sheet cassette 109 in front of (at the right-hand side as viewed in FIG. 13) the photosensitive drum, but these can be supplied manually. There is a sheet supplying roller 110 at an end portion of the sheet cassette 109, for supplying each sheet 112 in the cassette 109 into a sheet supply path.

The paper sheet 112 having an unfixed toner image transferred thereto in the manner described above is conveyed to a fixing device behind (at the left-hand side as viewed in FIG. 14) the photosensitive drum 101. The fixing device comprises a fixing roller 113 having a built-in fixing heater (not shown) and a pressing roller 114 disposed to be press-contacted to the fixing roller 113. The transfer sheet 112 supplied from the image transfer station is heated under pressure at the press contact area between the fixing roller 113 and the pressing roller 114, whereby the unfixed toner image on the transfer sheet 112 is fixed thereon.

Behind the fixing roller 113, there are sheet discharging rollers 116 which function to discharge the image-fixed sheet 112 out of the image forming apparatus.

While not shown in FIG. 14, the print controller 111 has various functions in addition to the data conversion function described hereinbefore, such as for controlling a motor 115 or any other components inside the image forming apparatus as well as a polygon motor inside the optical scanning unit (to be described later).

There is no particular limitation with regard to the recording density of the image forming apparatus to be used in the present invention. However, since the higher the recording density is, the higher the required image quality is, the structures according to the first and second embodiments of the present invention will be more effective when they are introduced into an image forming apparatus of a resolution 1200 dpi or higher.

Embodiment of Color Image Forming Apparatus

Figure 15:
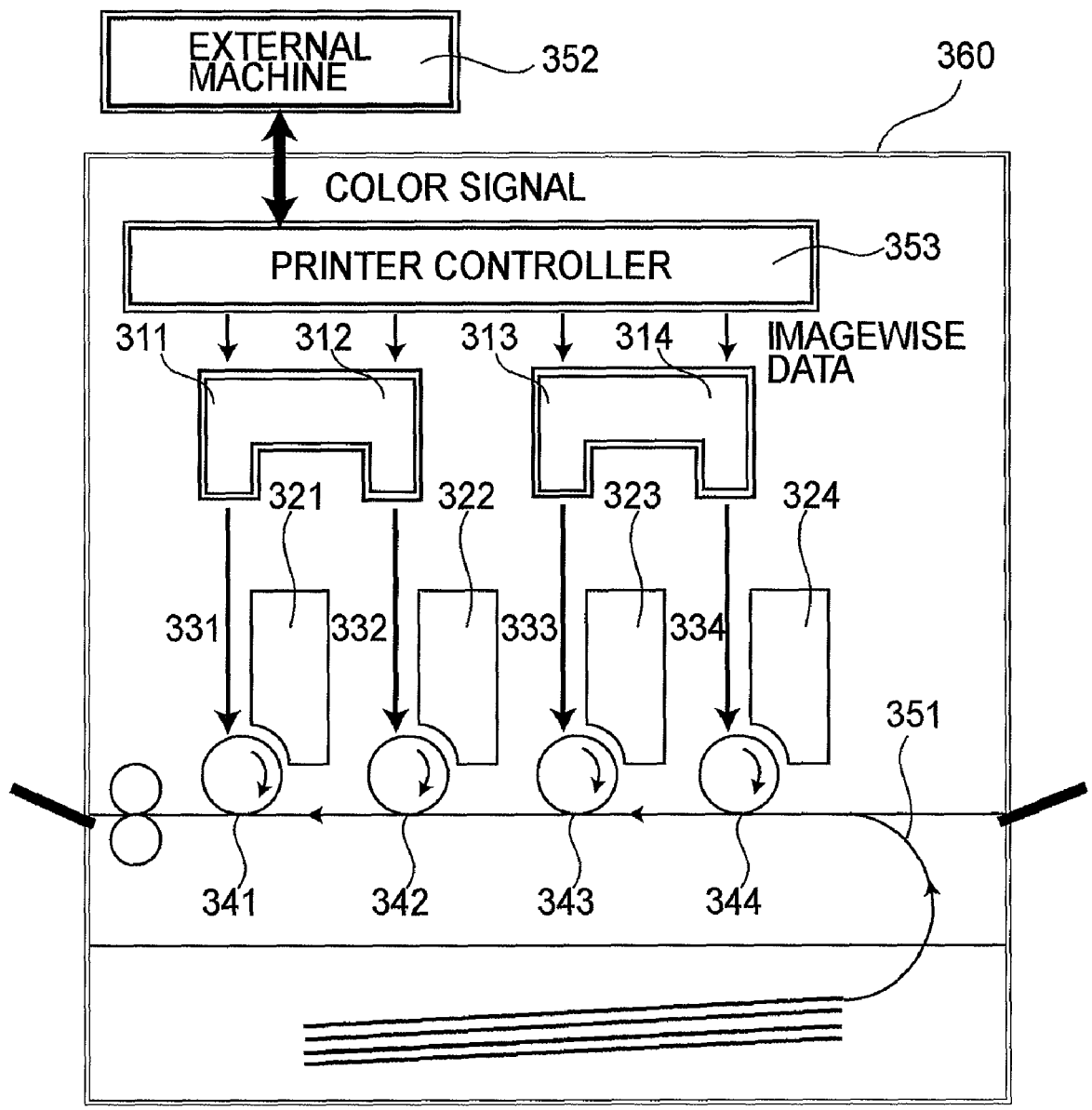
FIG. 15 is a schematic diagram of a main portion of a color image forming apparatus according to an embodiment of the present invention.
Figure 16:
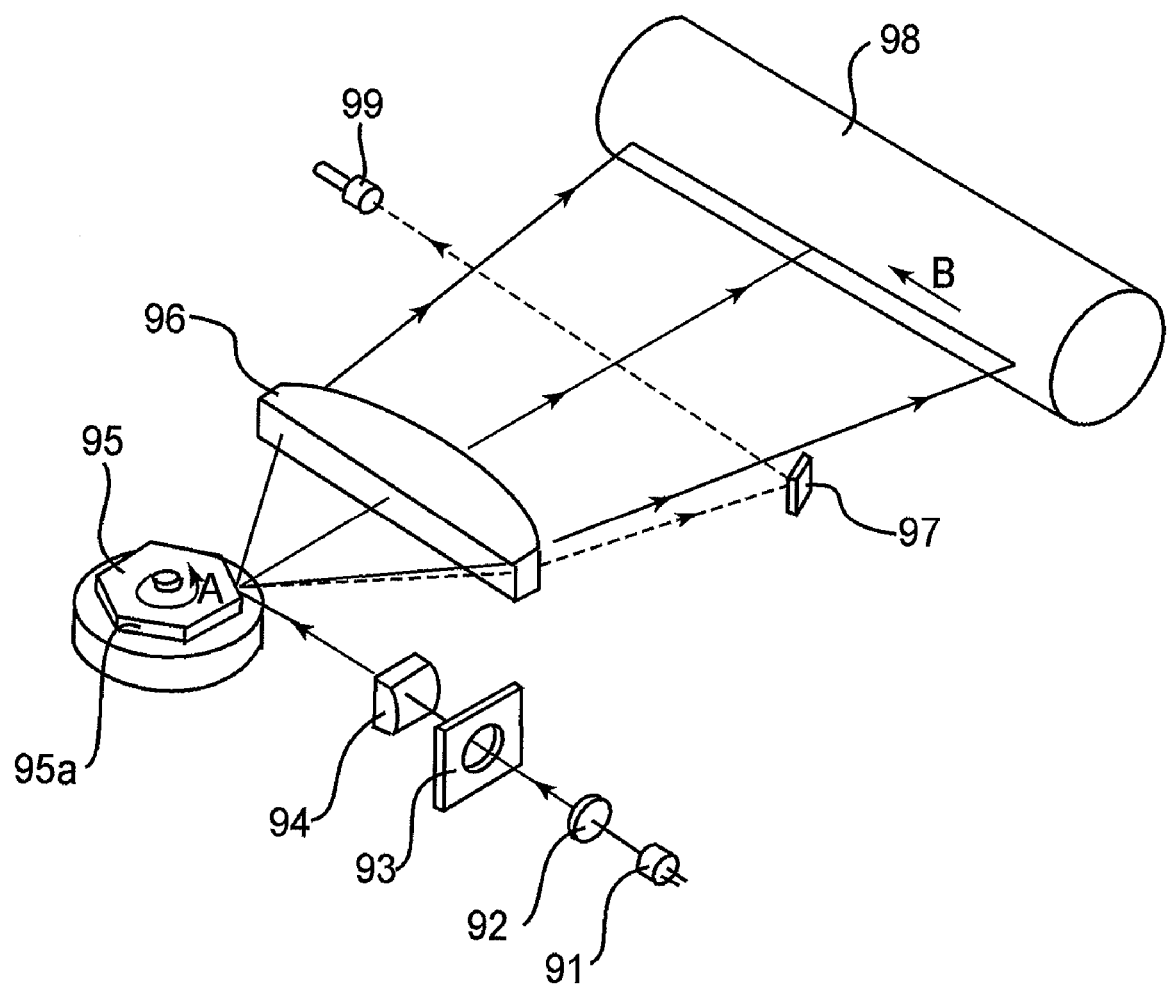
FIG. 16 is a schematic diagram of a main portion of a conventional optical scanning device.

FIG. 15 is a schematic view of a main portion of a color image forming apparatus according to an embodiment of the present invention. This embodiment is directed to a tandem type color image forming apparatus in which four optical scanning devices are provided so as to record imagewise data upon the surfaces of corresponding photosensitive drums (image bearing members) in parallel to each other.

In FIG. 15, denoted generally at 360 is a color image forming apparatus, and denoted at 311, 312, 313 and 314 are optical scanning devices having a structure according to any one of the preceding embodiments. Denoted at 341, 342, 343 and 344 are photosensitive drums (image bearing members), and denoted at 321, 322, 323 and 324 are developing devices, respectively. Denoted at 351 is a conveyance belt.

In FIG. 15, the color image forming apparatus 360 receives color signals of R (red), G (green) and B (blue) supplied thereto from an outside machine 352 such as a personal computer, for example. These color signals are transformed by means of a printer controller 353 inside the image forming apparatus, into imagewise data (dot data) corresponding to C (cyan), M (magenta), Y (yellow) and B (black).

These imagewise data are inputted into the optical scanning devices 311, 312, 313 and 314, respectively. In response, these optical scanning devices produce light beams 331, 332, 333 and 334 having been modulated in accordance with the associated imagewise data. Through these light beams, the photosensitive surfaces of the photosensitive drums 341, 342, 343 and 344 are scanned in the main-scan direction.

The color image forming apparatus of this embodiment uses two sets of optical scanning devices (311, 312) and (313, 314), and these correspond to colors of C (cyan), M (magenta), Y (yellow) and B (black), respectively. These scanning devices are operable in parallel to each other to record imagewise signals upon the surfaces of the photosensitive drums 341, 342, 343 and 344, respectively, so that a color image can be printed at high speed.

As described, the color image forming apparatus of this embodiment uses four optical scanning devices 311, 312, 313 and 314 to produce latent images for different colors upon the surfaces of corresponding photosensitive drums 341, 342, 343 and 344, respectively, by use of light beams based on respective image data. After that, these images are superposedly transferred onto a recording sheet, whereby a single full-color image is produced thereon.

As regards the outside machine 352, a color image reading machine having a CCD sensor, for example, may be used. In that occasion, this color image reading machine and the color image forming apparatus 360 will provide a color digital copying machine.

While the invention has been described with reference to the structures disclosed herein, it is not confined to the details set forth and this application is intended to cover such modifications or changes as may come within the purposes of the improvements or the scope of the following claims.

This application claims priority from Japanese Patent Application No. 2008-009080 filed Jan. 18, 2008, which is hereby incorporated by reference.

What is claimed is:

1. An optical scanning device, comprising:
   at least one scanning unit including deflecting means configured to scanningly deflect a light beam emitted from light source means, and an imaging optical system configured to image the light beam scanningly deflected by a deflecting surface of said deflecting means upon a plurality of photosensitive drums,
   wherein, in each of a plurality of light paths extending from said deflecting means to the plurality of photosensitive drums, at least one reflection member is provided to turn the light path in a sub-scan direction at a turn angle,
   wherein the plurality of light paths are different in the number of the reflection members,
   wherein a polarization direction of a light beam incident on a reflection surface of each reflection member disposed at each of the plurality of light paths is S-polarized at an optical axis of said imaging optical system,
   wherein the reflection surfaces of all the reflection members disposed at the plurality of light paths have the same film structure,
   wherein a difference between totals of the turn angles in any two of the optical paths at the optical axis of said imaging optical system is not greater than 40 degrees, and
   wherein, when the incidence angle of the light beam on the reflection member in the sub-scan direction at the optical axis of said imaging optical system is $\beta$, the incidence angle of the light beam on the reflection member in the sub-scan direction outside the optical axis of said imaging optical system is $\delta$, a reflectance as an S-polarized light is incident on the reflection member at an incidence angle $\delta$ is $Rs(\delta)$, and a reflectance as a P-polarized light is incident on the reflection member at an incidence angle $\delta$ is $Rp(\delta)$, and when $\delta \geq 50$ degrees, a condition $$0.94 \leq 1 + \left(\frac{Rp(\delta)}{Rs(\delta)} - 1\right)\frac{1}{1+D} \leq 0.99$$

where $$\frac{1}{D} = \left(1 - \frac{\cos^2\delta}{\cos^2\beta}\right)\tan^2\beta$$

is satisfied.

2. An optical scanning device according to claim 1, wherein, at a light path among the plurality of light paths having fewer reflection member or members than the other light paths, there is a reflection member having an incidence angle of the light beam upon the reflection member in the sub-scan direction at the optical axis of said imaging optical system, which incidence angle is not less than 40 degrees.

3. An optical scanning device according to claim 1, wherein, at a light path among the plurality of light paths having more reflection members than the other light paths, there is a reflection member having an incidence angle of the light beam upon the reflection member in the sub-scan direction at the optical axis of said imaging optical system, which incidence angle is not greater than 30 degrees.

4. An optical scanning device, comprising:
   at least one scanning unit including deflecting means configured to scanningly deflect a light beam emitted from light source means, and an imaging optical system configured to image the light beam scanningly deflected by a deflecting surface of said deflecting means upon a plurality of photosensitive drums,
   wherein, in each of a plurality of light paths extending from said deflecting means to the plurality of photosensitive drums, at least one reflection member is provided to turn the light path in a sub-scan direction at a turn angle,
   wherein the plurality of light paths are different in the number of the reflection members,
   wherein a polarization direction of a light beam incident on a reflection surface of each reflection member disposed at each of the plurality of light paths is S-polarized at an optical axis of said imaging optical system,
   wherein the reflection surfaces of all the reflection members disposed at the plurality of light paths have the same film structure,
   wherein a difference between totals of the turn angles in any two of the optical paths at the optical axis of said imaging optical system is not greater than 40 degrees, and
   wherein, when the incidence angle of the light beam on the reflection member in the sub-scan direction at the optical axis of said imaging optical system is $\beta$, the incidence angle of the light beam on the reflection member in the sub-scan direction outside the optical axis of said imaging optical system is $\delta$, a reflectance as an S-polarized light is incident on the reflection member at an incidence angle $\delta$ is $Rs(\delta)$, and a reflectance as a P-polarized light is incident on the reflection member at an incidence angle $\delta$ is $Rp(\delta)$, and when $\delta \leq 50$ degrees, a condition $$0.97 \leq 1 + \left(\frac{Rp(\delta)}{Rs(\delta)} - 1\right)\frac{1}{1+D} \leq 1.00$$

where

-continued $$\frac{1}{D} = \left(1 - \frac{\cos^2\delta}{\cos^2\beta}\right)\tan^2\beta$$

is satisfied.

5. An image forming apparatus, comprising:
an optical scanning device as recited in claim 1;
a photosensitive member disposed at a surface to be scanned;
a developing device configured to develop an electrostatic latent image formed on said photosensitive member with a light beam scanningly deflected by said optical scanning device, to produce a toner image;
a transferring device configured to transfer the developed toner image onto a transfer material; and
a fixing device configured to fix the transferred toner image, on the transfer material.

6. An image forming apparatus, comprising:
an optical scanning device as recited in claim 1; and
a printer controller configured to convert code data supplied from an outside machine into an imagewise signal and to input the imagewise signal into said optical scanning device.

7. A color image forming apparatus, comprising:
an optical scanning devices as recited in claim 1; and
a plurality of image bearing members each being disposed at a surface to be scanned by said optical scanning device, and configured to form images of different colors.

8. A color image forming apparatus according to claim 7, further comprising a printer controller configured to convert a color signal supplied from an outside machine into imagewise data of different colors and to input the imagewise data into corresponding optical scanning devices.

9. An optical scanning device according to claim 4, wherein, at a light path among the plurality of light paths having fewer reflection member or members than the other light paths, there is a reflection member having an incidence angle of the light beam upon the reflection member in the sub-scan direction at the optical axis of said imaging optical system, which incidence angle is not less than 40 degrees.

10. An optical scanning device according to claim 4, wherein, at a light path among the plurality of light paths having more reflection members than the other light paths, there is a reflection member having an incidence angle of the light beam upon the reflection member in the sub-scan direction at the optical axis of said imaging optical system, which incidence angle is not greater than 30 degrees.

11. An image forming apparatus, comprising:
an optical scanning device as recited in claim 4;
a photosensitive member disposed at a surface to be scanned;
a developing device configured to develop an electrostatic latent image formed on said photosensitive member with a light beam scanningly deflected by said optical scanning device, to produce a toner image;
a transferring device configured to transfer the developed toner image onto a transfer material; and
a fixing device configured to fix the transferred toner image, on the transfer material.

12. An image forming apparatus, comprising:
an optical scanning device as recited in claim 4; and
a printer controller configured to convert code data supplied from an outside machine into an imagewise signal and to input the imagewise signal into said optical scanning device.

13. A color image forming apparatus, comprising:
an optical scanning devices as recited in claim 4; and
a plurality of image bearing members each being disposed at a surface to be scanned by said optical scanning device, and configured to form images of different colors.

14. A color image forming apparatus according to claim 4, further comprising a printer controller configured to convert a color signal supplied from an outside machine into imagewise data of different colors and to input the imagewise data into corresponding optical scanning devices.

* * * * *